(12) United States Patent
Akagi

(10) Patent No.: US 10,887,473 B2
(45) Date of Patent: Jan. 5, 2021

(54) IMAGE READING APPARATUS AND IMAGE FORMING APPARATUS FOR DETECTING WHETHER SHEET IS PROTRUDING FROM READABLE RANGE

(71) Applicant: CANON KABUSHIKI KAISHA, Tokyo (JP)

(72) Inventor: Daisuke Akagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/785,447

(22) Filed: Feb. 7, 2020

(65) Prior Publication Data

US 2020/0177737 A1 Jun. 4, 2020

Related U.S. Application Data

(63) Continuation of application No. 15/919,893, filed on Mar. 13, 2018, now Pat. No. 10,602,002.

(30) Foreign Application Priority Data

Mar. 30, 2017 (JP) ................................ 2017-068742

(51) Int. Cl.
*H04N 1/00* (2006.01)
*H04N 1/047* (2006.01)
*G03G 15/00* (2006.01)

(52) U.S. Cl.
CPC ..... *H04N 1/00045* (2013.01); *H04N 1/00018* (2013.01); *H04N 1/0066* (2013.01); *H04N 1/0071* (2013.01); *H04N 1/00713* (2013.01); *H04N 1/00737* (2013.01); *H04N 1/00753* (2013.01); *G03G 15/607* (2013.01); *H04N 1/00681* (2013.01); *H04N 1/00684* (2013.01);
(Continued)

(58) Field of Classification Search
None
See application file for complete search history.

(56) References Cited

U.S. PATENT DOCUMENTS 4,338,020 A 7/1982 Yukawa et al. ............... 355/41
4,929,844 A 5/1990 Houjiyou et al. ......... 250/559.2
(Continued)

FOREIGN PATENT DOCUMENTS

| CN | 106331408 | 1/2017 |
|---|---|---|
| JP | H05-207239 | 8/1993 |

(Continued)

OTHER PUBLICATIONS

Extended European Search Report dated Aug. 29, 2018, in counterpart European Application No. 18160741.7.
(Continued)

*Primary Examiner* — Miya J Williams
(74) *Attorney, Agent, or Firm* — Venable LLP

(57) ABSTRACT

An image reading apparatus comprises a platen, a support, a reader, an open/close unit, a first obtainer, a mark, a positioning member, and a determiner. A position of the mark on a pressing surface of the cover, is provided at a position at which, in a case where a sheet of a maximum size among standard sizes that can entirely fit in a readable range of the reader is positioned with respect to the positioning member, at least a portion of the mark is not hidden by the sheet as viewed from the reader.

15 Claims, 24 Drawing Sheets

(52) U.S. Cl.
CPC ..... *H04N 1/00702* (2013.01); *H04N 1/00708* (2013.01); *H04N 1/047* (2013.01)

(56) References Cited

U.S. PATENT DOCUMENTS

| | | | |
|---|---|---|---|
| 5,218,408 A | 6/1993 | Inada et al. .................... | 399/376 |
| 7,539,344 B2 | 5/2009 | Eguchi et al. ................ | 382/199 |
| 2003/0081267 A1* | 5/2003 | Cantwell ................ | H04N 1/121 |
| | | | 358/474 |
| 2006/0001923 A1* | 1/2006 | Kakutani ............. | H04N 1/0071 |
| | | | 358/509 |
| 2007/0285690 A1 | 12/2007 | Matsuda et al. ............... | 358/1.9 |
| 2008/0094668 A1* | 4/2008 | Matsui ............... | H04N 1/00748 |
| | | | 358/449 |
| 2008/0186531 A1 | 8/2008 | Ikeda .......................... | 358/1.15 |
| 2009/0109496 A1 | 4/2009 | Baba ............................ | 358/449 |
| 2010/0053706 A1 | 3/2010 | Jasinski et al. ............... | 358/498 |
| 2010/0157381 A1 | 6/2010 | Chen ............................ | 358/449 |
| 2011/0122455 A1* | 5/2011 | Elliot ................ | H04N 1/00063 |
| | | | 358/406 |
| 2011/0181920 A1* | 7/2011 | Kim ................... | H04N 1/00681 |
| | | | 358/474 |
| 2011/0216378 A1 | 9/2011 | Poon et al. .................... | 358/474 |
| 2014/0002965 A1 | 1/2014 | Murray .................... | 361/679.01 |
| 2015/0015922 A1* | 1/2015 | Isaev .................. | H04N 1/00018 |
| | | | 358/449 |
| 2017/0001821 A1 | 1/2017 | Sato et al. ................ | B65H 7/14 |
| 2017/0331983 A1 | 11/2017 | Ishido et al. ......... | H04N 1/6077 |
| 2018/0054546 A1 | 2/2018 | Mori ......................... | G06T 5/40 |
| 2018/0176400 A1 | 6/2018 | Shimizu ............. | H04N 1/00708 |
| 2018/0249041 A1* | 8/2018 | Moro ................ | H04N 1/00806 |
| 2018/0278789 A1 | 9/2018 | Shibahara ............ | H04N 1/1061 |

FOREIGN PATENT DOCUMENTS

| | | |
|---|---|---|
| JP | 2004-201240 | 7/2004 |
| JP | 2008-154076 | 7/2008 |

OTHER PUBLICATIONS

CN Office Action dated Aug. 8, 2019 in counterpart CN Application No. 201810258307.X with English translation.

* cited by examiner

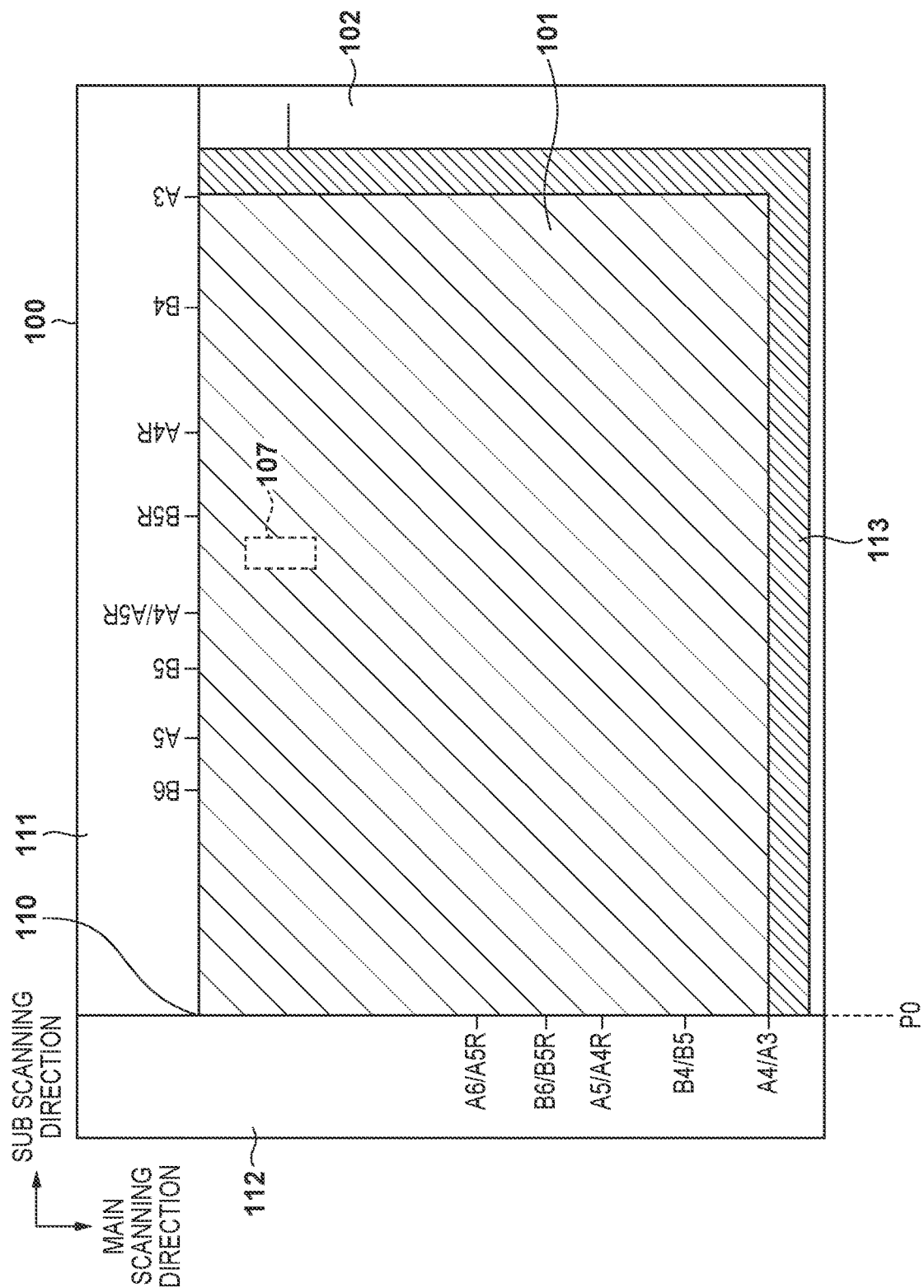

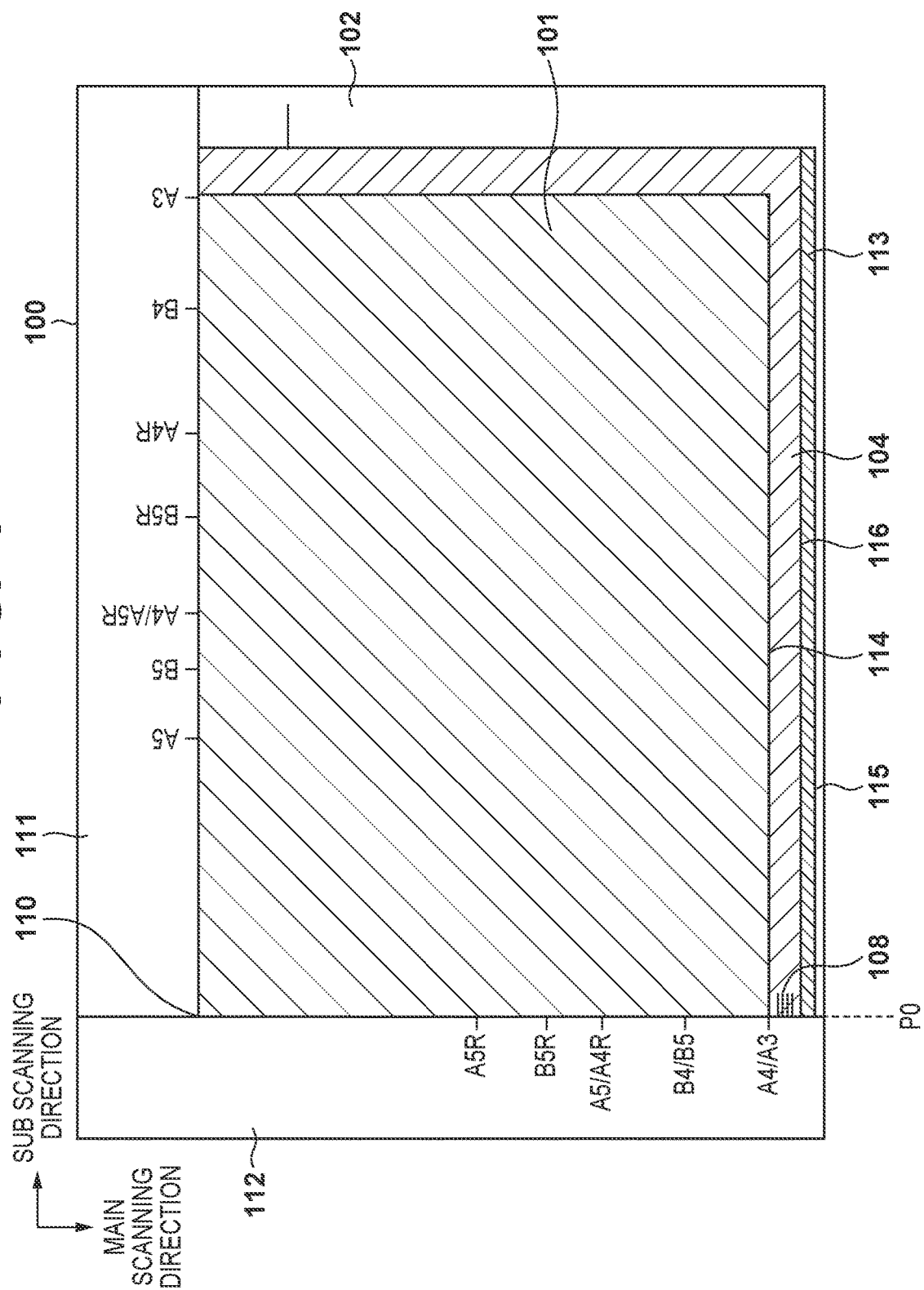

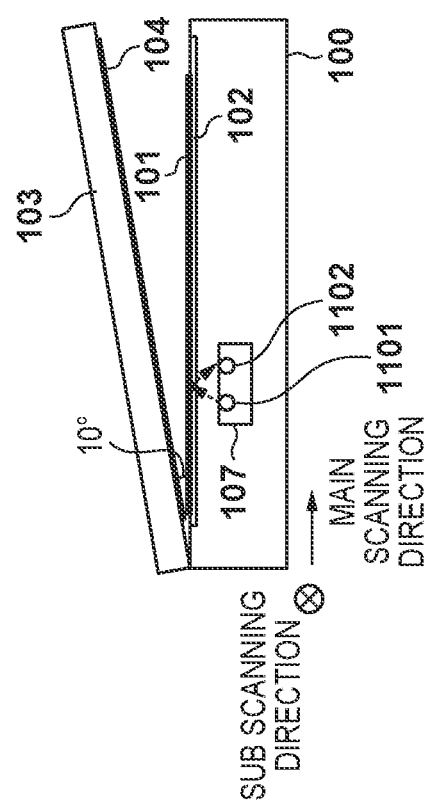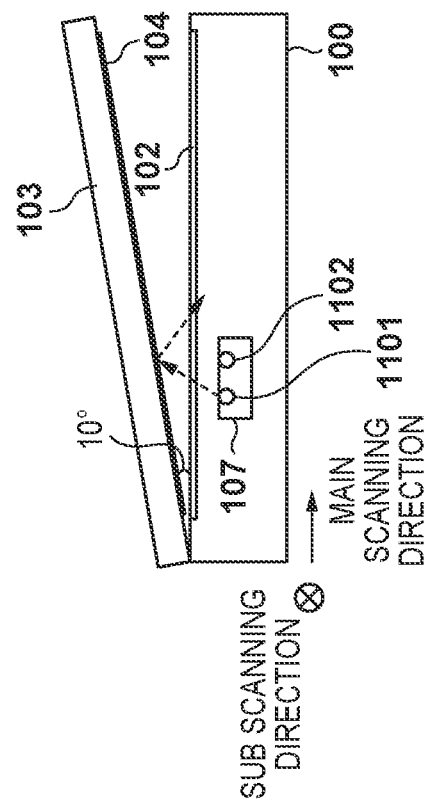

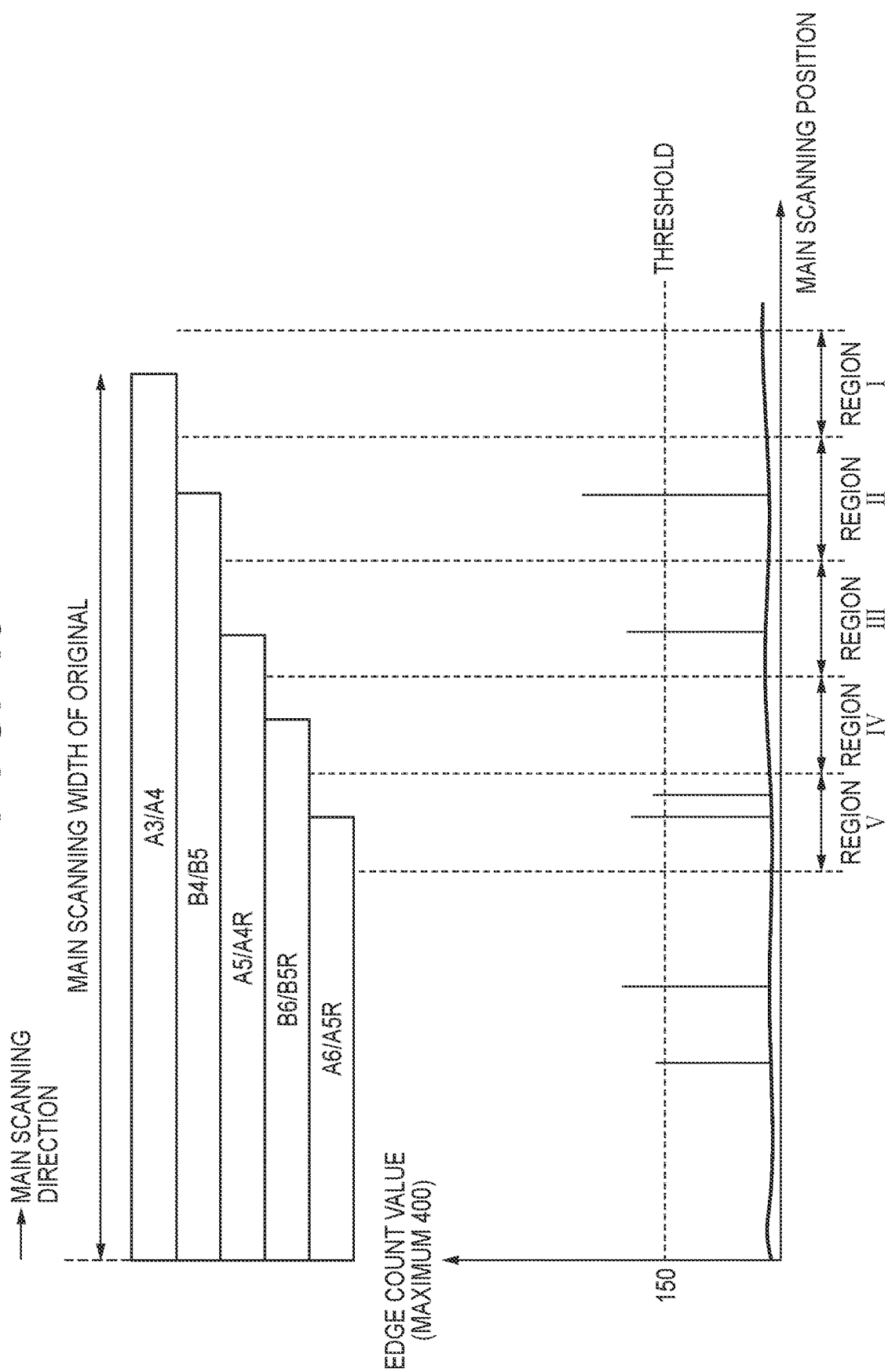

F I G. 17

| REGION | MAIN SCANNING SIZE | OUTPUT LOGIC OF ORIGINAL SENSOR | ORIGINAL SIZE |
|---|---|---|---|
| I (PROTRUSION) | A3/A4 | Hi | A3 |
| | | Low | A4 |
| II | B4/B5 | Hi | B4 |
| | | Low | B5 |
| III | A4R/A5 | Hi | A4R |
| | | Low | A5 |
| IV | B5R/B6 | Hi | B5R |
| | | Low | B6 |
| V | A5R | Hi | A5R |
| | | Low | — |

FIG. 19

| REGION | MAIN SCANNING SIZE | OUTPUT LOGIC OF ORIGINAL SENSOR | ORIGINAL SIZE |
|---|---|---|---|
| (PROTRUSION) | INDEFINITE | — | INDEFINITE |
|  |  | — | INDEFINITE |
| I | A3/A4 | Hi | A3 |
|  |  | Low | A4 |
| II | B4/B5 | Hi | B4 |
|  |  | Low | B5 |
| III | A4R/A5 | Hi | A4R |
|  |  | Low | A5 |
| IV | B5R/B6 | Hi | B5R |
|  |  | Low | B6 |
| V | A5R | Hi | A5R |
|  |  | Low | - |

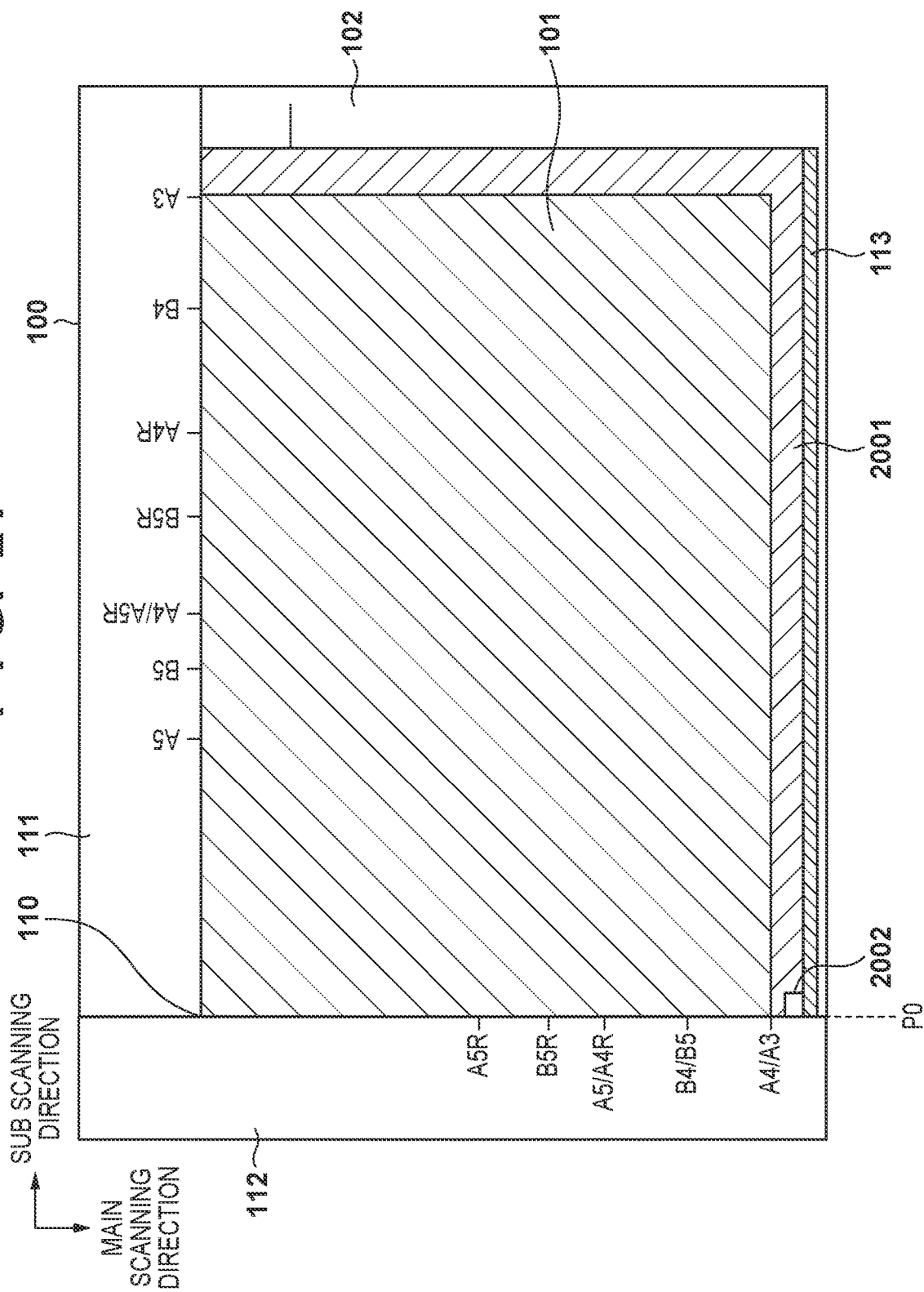

FIG. 22
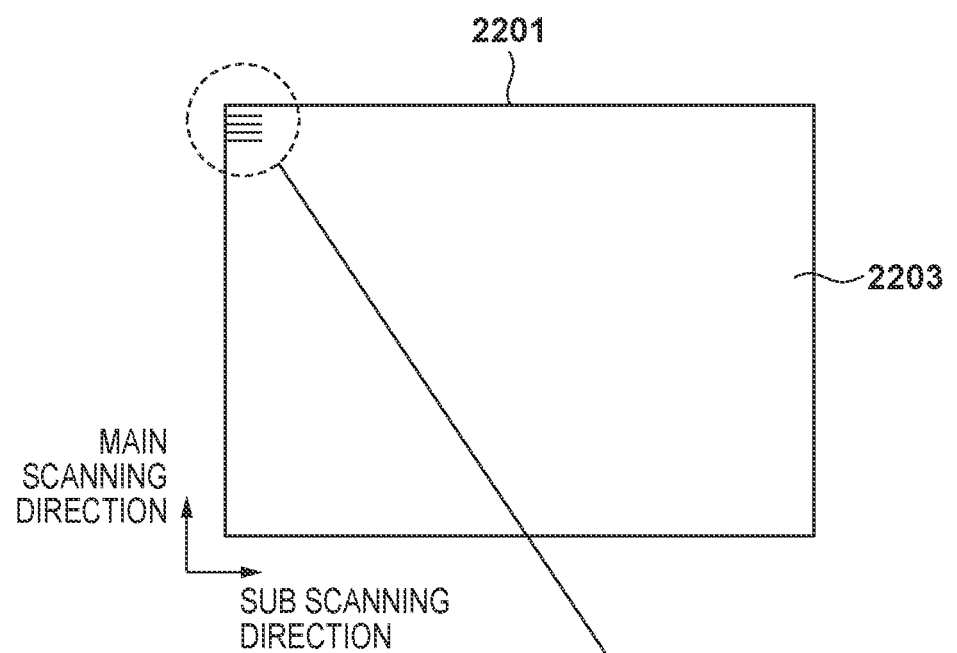
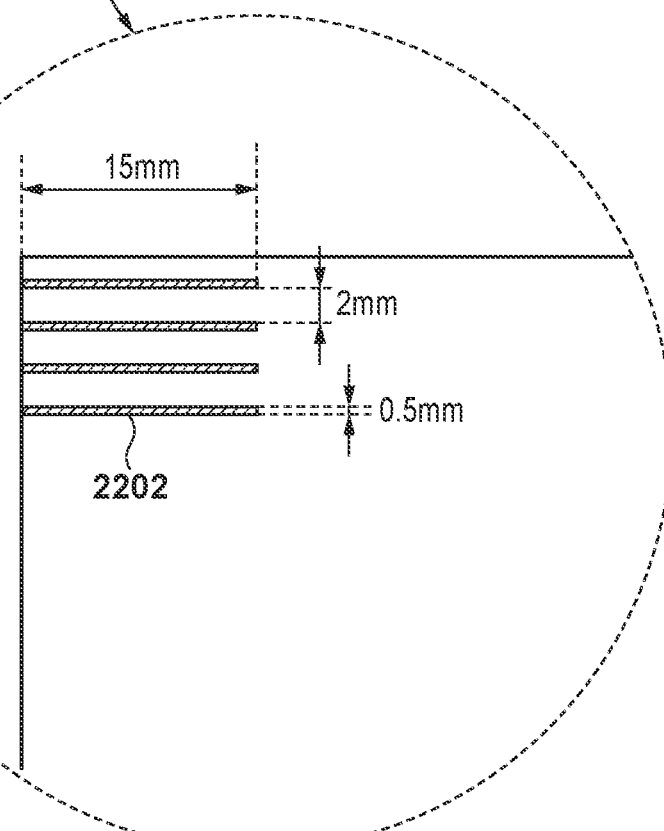

IMAGE READING APPARATUS AND IMAGE FORMING APPARATUS FOR DETECTING WHETHER SHEET IS PROTRUDING FROM READABLE RANGE

This application is a continuation of U.S. patent application Ser. No. 15/919,893, filed Mar. 13, 2018, currently pending; and claims the benefit of priority under 35 U.S.C. § 119 of Japan Application No. 2017-068742, filed in Japan on Mar. 30, 2017; the contents of all of which are hereby incorporated by reference as if set forth herein in full.

BACKGROUND OF THE INVENTION

Field of the Invention

The present invention relates to an image reading apparatus and an image forming apparatus for detecting whether an original is protruding from a readable range.

Description of the Related Art

An original reading apparatus has a sensor for detecting the size of an original placed on a platen glass. Information indicating the size of the original reduces the burden of an operator designating the size of a sheet to which the original is to be copied. Japanese Patent Laid-Open No. 05-207239 proposes, by reading a portion of an original by an image sensor, detecting the size of the original in a widthwise direction (a main scanning direction), and further detecting the size of the original in a lengthwise direction (a sub scanning direction) by a sensor. By this, a sensor for detecting the size of an original in the main scanning direction is eliminated. Japanese Patent Laid-Open No. 2004-201240 proposes extracting an edge of an original in a main scanning direction by reading a portion of the original by an image sensor, and detecting the size of the original in the main scanning direction based on a position of the extracted edge.

The conventional technique is premised upon the area of an original being less than the area of a platen glass. In other words, no consideration is given to an original that is larger than the platen glass, such as a map or a poster. When an original that is larger than a platen glass is placed on the platen glass, no edge of the original will be present inside the region of the platen glass. Accordingly, there is a possibility that a ruled line or the like printed on an original will be extracted as an edge instead of an edge of the original, and the original size will be erroneously detected.

SUMMARY OF THE INVENTION

The present invention detects that an original is protruding from a readable range of a reader for reading originals.

The present invention provides an image reading apparatus, comprising: a platen having a transparency and on which a sheet is placed; a support configured to support the platen; a reader configured to read an image by receiving light reflected from the sheet placed on the platen; an open/close unit configured to be able to open/close with respect to the platen, and comprising a pressure plate that presses the sheet placed on the platen when in a closed position with respect to the platen; a first obtainer configured to, in a state in which the open/close unit is in a closed position with respect to the platen, where a first direction is a direction of scanning by the reader for reading a sheet placed on the platen and a second direction is a direction orthogonal to the first direction, scan the sheet in the first direction by the reader, and obtain information related to a position of an edge positioned outermost in the second direction of the sheet; a mark formed on a pressing surface, which presses the sheet, of the pressure plate; a positioning member configured to position the sheet placed on the platen by a user in the second direction; and a determiner configured to, in a case where the open/close unit is in a closed position with respect to the platen, determine that the sheet is not protruding from a readable range of the reader if the reader can read the mark, and determine that the sheet is protruding from the readable range if the reader cannot read the mark, and wherein a position of the mark on the pressing surface, is provided at a position at which, in a case where a sheet of a maximum size among standard sizes that can entirely fit in the readable range is aligned with respect to the positioning member, at least a portion of the mark is not hidden by the sheet as viewed from the reader.

Further features of the present invention will become apparent from the following description of exemplary embodiments (with reference to the attached drawings).

BRIEF DESCRIPTION OF THE DRAWINGS

FIG. 2 is a view illustrating an original platen.
FIG. 4 is a view for describing the position of a mark.
FIGS. 11A and 11B are views illustrating operation of an original sensor.
FIG. 16 is a view for describing a method for determining a main scanning size.
FIG. 17 is a view illustrating a main scanning size determination table.
FIG. 19 is a view illustrating a main scanning size determination table.
FIG. 21 is a view for describing the position of a mark.
FIG. 22 is a view illustrating a mark.

DESCRIPTION OF THE EMBODIMENTS

First Embodiment

The first embodiment provides protrusion detection in which it is detected whether or not an original (sheet) is protruding from a readable range of a reader for reading originals. For example, a protrusion may be determined in accordance with whether or not the reader can read a mark provided on a pressure plate for pressing originals against the platen glass. Also, in the first embodiment, switching of the logic for determining the original main scanning size in accordance with whether or not the original is protruding is provided. Accordingly, the original main scanning size determination accuracy is improved, and furthermore the original size (main scanning size and sub scanning size) determination accuracy is improved. The main scanning size means the size of the original in a main scanning direction, and may also be called the main scanning length or the width of the original. The sub scanning size means the size of the original in a sub scanning direction, and may also be called the sub scanning length or the length of the original. The main scanning direction means a direction orthogonal in relation to the sub scanning direction. The sub scanning direction means the direction in which the reader moves in order to read the original. Note that in the present embodiment, description is given using a reader configured by a unit in which the light source and the image sensor are integrated. However, configuration may be taken so as to cause a light source to move in the sub scanning direction, and guide reflected light from an original to a fixed image sensor.

<Original Reading Apparatus>

Figure 1:
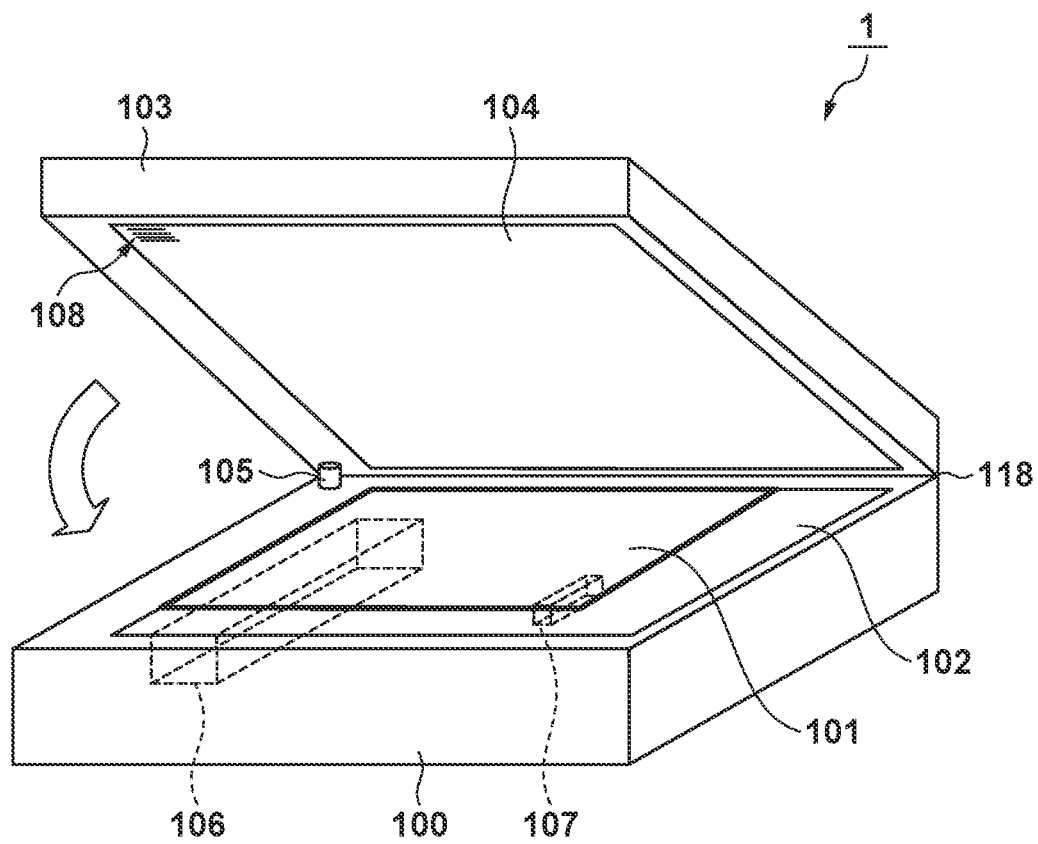
FIG. 1 is a view illustrating an original reading apparatus.

As FIG. 1 illustrates, an original reading apparatus 1 has a box-shaped housing 100 and a cover 103. The cover 103 is a one example of the open/close unit. The cover 103 is fixed to the housing 100 via a hinge 118 or the like, and is provided to be able to open/close in relation to an original platen glass 102. When the cover 103 opens, the original platen glass 102 which is provided in the housing 100 is exposed, and an operator can place an original 101 on the original platen glass 102. When the cover 103 closes, the original 101 is pressed to the original platen glass 102 by a pressure plate 104 which is provided at the bottom surface of the cover 103. The color of the surface facing the original 101 in the pressure plate 104 is white. The area of the top surface of the housing 100 and the area of the bottom surface of the cover 103 are approximately the same, and the cover 103 can cover the top surface of the housing 100. Close to the rotation axis of the cover 103 in the top surface of the housing 100, an open/close sensor 105 for detecting an open angle of the cover 103 is provided. A detection member of the open/close sensor 105 is popped out from the top surface of the housing 100 when the cover 103 is open. When the cover 103 is closed, the detection member of the open/close sensor 105 is pressed by the bottom surface of the cover 103, and withdraws into the housing 100. In other words, the amount that the detection member of the open/close sensor 105 projects correlates to the open angle of the cover 103. The open/close sensor 105 outputs a detection signal in accordance with the projection amount (open angle).

A reader 106 is provided on the lower part of the original platen glass 102 in the housing 100. The reader 106 has a light source for illuminating a read surface of the original 101 and an image sensor or the like for reading the original 101. The reader 106 moves in a rightward direction (sub scanning direction) and a leftward direction in FIG. 1 by a driving source such as a motor. In particular, the reader 106 reads the original 101 which is placed on the original platen glass 102 while moving in the sub scanning direction. Engraved marks 108, which are useful in detecting whether or not the original 101 have been placed so as to protrude from the readable range on the original platen glass 102, are engraved at an end of the pressing surface of the pressure plate 104. For example, the original reading apparatus 1 determines that the original 101 is protruding from the readable range if the engraved marks 108 cannot be read. The original reading apparatus 1 determines that the original 101 is not protruding from the readable range if the engraved marks 108 can be read.

An original sensor 107 is provided on the lower part of the original platen glass 102 in the housing 100. The original sensor 107 is a size detection sensor for measuring the length in the sub scanning direction of the original 101 placed on the original platen glass 102. For example, the original sensor 107 may be a simple sensor that detects whether or not the sub scanning length of the original 101 is a predetermined length or more.

<Original Placement Surface>

As FIG. 2 illustrates, the original reading apparatus 1 can read the entirety of the original 101 of an A3 size at a maximum in one sub scan when the original 101 is placed in a horizontal direction. However, the area of the original placement surface of the original platen glass 102 is larger than the area of the original 101 of the A3 size. Also, the reader 106 is configured such that it is possible to read a somewhat wider range than that of the original 101 of the A3 size. In FIG. 2, a readable range 113 of the reader 106 is illustrated.

As FIG. 2 illustrates, a positioning member 111 for aligning the original 101 in the main scanning direction and a positioning member 112 for aligning the original 101 in the sub scanning direction are provided on the top surface of the housing 100. An alignment side of the positioning member 111 and an alignment side of the positioning member 112 are orthogonal at an alignment origin 110. In other words, by aligning one corner of the original 101 with the alignment original 110, the longer side of the original 101 becomes parallel with the positioning member 111 and the shorter side of the original 101 becomes parallel with the positioning member 112. When the original 101 of the A4 size is placed vertically, the shorter side of the original 101 becomes parallel with the positioning member 111 and the longer side of the original 101 becomes parallel with the positioning member 112. Indexes indicating the size of the original 101 are printed or engraved on the positioning member 111 and the positioning member 112 respectively. Because the leading edge of the original 101 is aligned in relation to the alignment side of the positioning member 112, the position of the alignment side of the positioning member 112 is called the leading edge position P0.

As FIG. 2 illustrates, the original sensor 107 is arranged at a position at which it can distinguish between two sizes for which the width of the original 101 (main scanning length) is the same but the sub scanning length is different (example: A4 and A3 or the like). In this example, it is arranged between the index for B5R and the index for A5R in the sub scanning direction.

<Engraving>

Figure 3B:
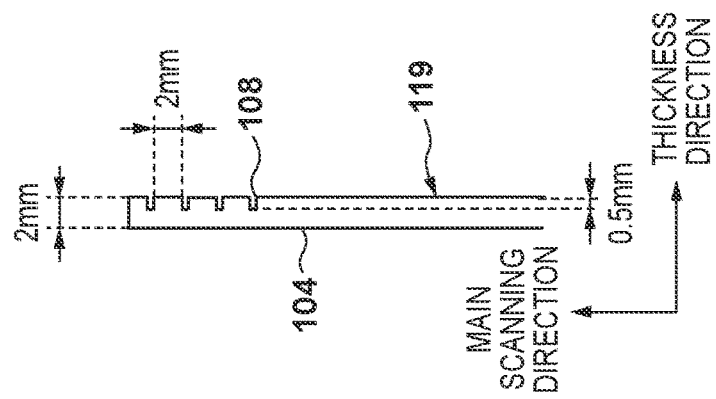
FIGS. 3A and 3B are views for illustrating marks.
Figure 3A:
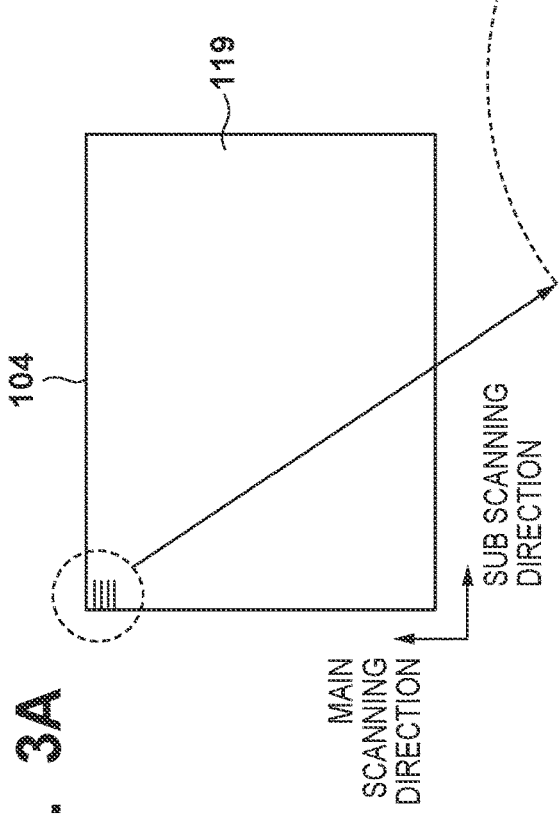

FIG. 3A illustrates a pressing surface 119 of the pressure plate 104. The pressure plate 104 is formed as a plastic plate whose thickness is 2 mm, for example. At an end of the pressing surface, four engraved marks 108 that are parallel in the sub scanning direction are provided. The length of the engraved marks 108 in the sub scanning direction is 15 mm, for example. The width of each of the engraved marks 108 is 0.5 mm, for example. The interval between two adjacent engraved marks 108 is 2 mm, for example.

FIG. 3B is a cross-sectional view of the engraved marks 108. The depth of the engraved marks 108 that are engraved in the pressing surface 119 of the pressure plate 104 is 0.5 mm, for example. It is sufficient that the length, width, interval, and depth of the engraved marks 108 be large enough that it is possible perform edge extraction for the engraved marks 108 in an image obtained by reading the engraved marks 108 with the reader 106. In other words, these numbers are simply examples.

FIG. 4 illustrates a positional relationship between the original 101, the pressure plate 104, the engraved marks 108, and the readable range 113 in a state in which the cover 103 is closed and the pressure plate 104 is pressing the original 101. The area of the pressing surface 119 of the pressure plate 104 is somewhat larger than the area of A3. Accordingly, when the cover 103 is closed, the pressure plate 104 can cover the entirety of the original 101 of the A3 size. However, the original 101 is assumed to be aligned correctly in both the sub scanning direction and the main scanning direction. In the main scanning direction, the engraved marks 108 are positioned more to the outside than a longer side 114 of the A3 original 101 and more to the inside than a longer side 115 of the readable range 113 in the reader 106. Note that a longer side 116 of the pressing surface 119 of the pressure plate 104 is positioned between the longer side 114 of the A3 original 101 and the longer side 115 of the readable range 113.

<Controller>

Figure 5:
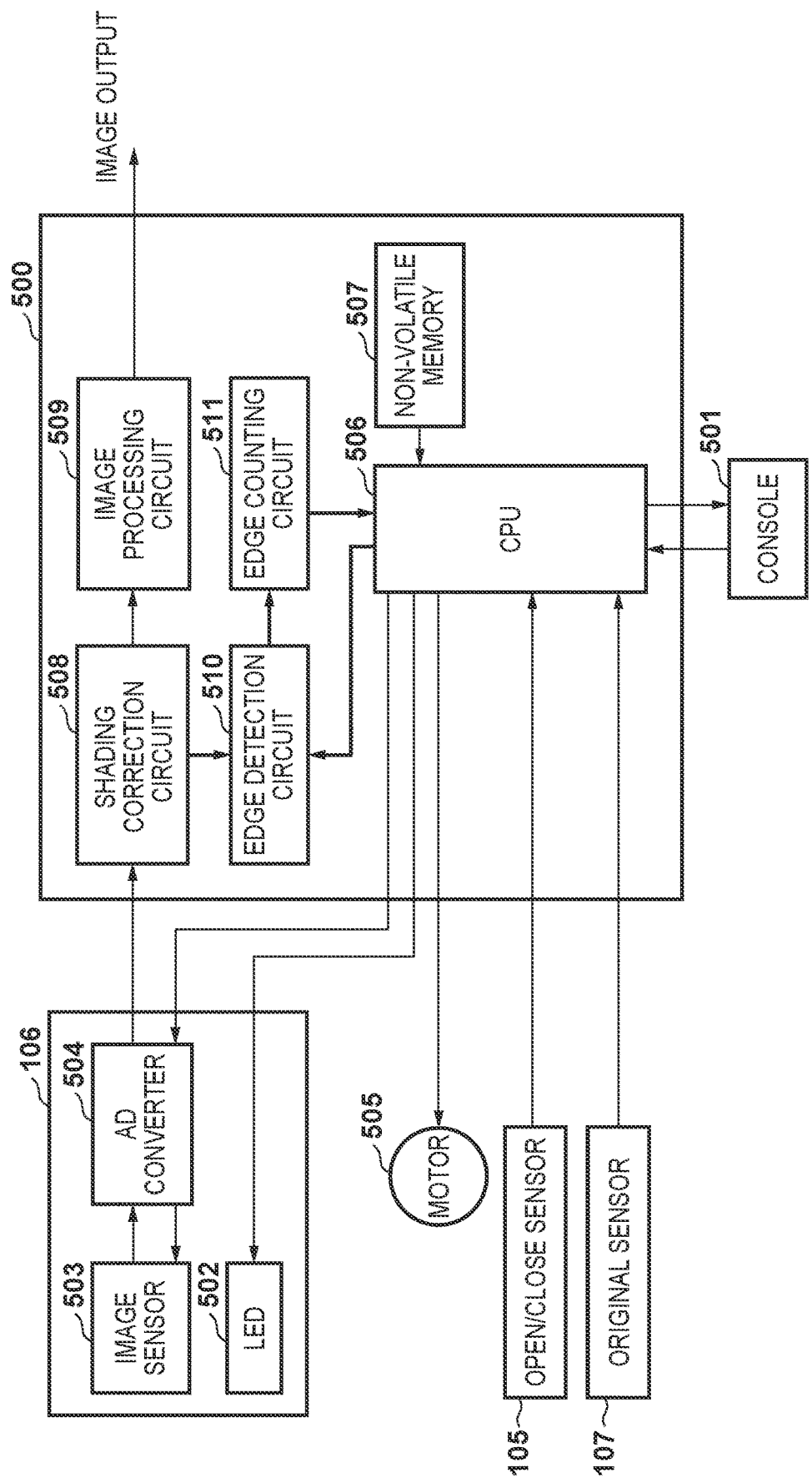
FIG. 5 is a block diagram illustrating a controller.

FIG. 5 illustrates a controller 500 for controlling the original reading apparatus 1. In the controller 500, a CPU 506 for controlling the original reading apparatus 1 and a nonvolatile memory 507 for storing a control program executed by the CPU 506 are mounted. The CPU 506, when a power supply is inputted, downloads a control program from the nonvolatile memory 507, and starts controlling the original reading apparatus 1 in accordance with the control program. A console 501 has an output apparatus for displaying information to the operator and an input apparatus for accepting instructions from the operator.

The reader 106 has an LED 502 which is a light source for illuminating the original 101. LED is an abbreviation of Light Emitting Diode. An image sensor 503 is an image sensing element for receiving reflected light from the original 101 which was illuminated by the LED 502, and converting it into an analog image signal. An AD converter 504 converts an analog image signal into digital image data. The image sensor 503 comprises a plurality of elements for detecting light of three colors—R (Red), G (Green), and B (Blue)—respectively. Consequently, it is possible read a color image printed on the original 101. Respective elements for R, G, and B are provided so that it is possible to cover all of the main scanning width of the readable range 113. The image sensor 503 outputs analog image data to the AD converter 504 in one line units.

When a read start instruction is inputted from the console 501, the CPU 506 activates the LED 502, the image sensor 503, and the AD converter 504, and causes a transition to a state in which the original 101 can be read. In other words, the CPU 506 is a controller of the reader 106, and a controller of a motor 505. The CPU 506 controls the motor 505 so as to cause the reader 106 to move in the sub scanning direction. By this, the reader 106 reads the original 101 that was placed on the original platen glass 102. The AD converter 504 outputs digital image data one line at a time to a shading correction circuit 508. The shading correction circuit 508 executes shading correction on the digital image data. Shading correction means image processing for correcting digital image data by using a correction coefficient generated by reading a white reference board with the reader 106 in advance. Unevenness in the amount of light of the LED 502 and variation in sensitivity between respective pixels of the image sensor 503 is reduced by the shading correction. The shading correction circuit 508 outputs, to an image processing circuit 509, corrected image data for each line. The image processing circuit 509 has a noise removal filter or the like, and removes or reduces a noise component from inputted image data. The image processing circuit 509 outputs the image data one line at a time. This image data (image signal) may be saved as an image file or may be outputted to a printer.

The open/close sensor 105 and the original sensor 107 are connected to the CPU 506. The CPU 506 recognizes the open angle of the cover 103 in accordance with a detection signal that the open/close sensor 105 outputs. For example, the open/close sensor 105 may return an analog voltage value according to the open angle of the cover 103 to the CPU 506. In accordance with the detection signal that the original sensor 107 outputs, the CPU 506 determines whether or not the original 101 is present above the original sensor 107. For example, the original sensor 107 outputs a "High signal" when the original 101 is detected, and outputs a "Low signal" if the original 101 is not detected. These sensors may output detection signals to the CPU 506 in real time when the power supply is inputted by the CPU 506.

The controller 500 is equipped with an edge detection circuit 510 and an edge counting circuit 511. Image data according to one color defined in advance among the image data of the three colors (R, G, and B) corrected by the shading correction circuit 508 is inputted into the edge detection circuit 510 one line at a time. In the present embodiment, it is assumed that G image data is inputted, but it may be R or B image data. The edge detection circuit 510 executes edge determination one pixel at a time in the main scanning direction when a start instruction is received from the CPU 506. The edge detection circuit 510 generates binary data that indicates whether or not each pixel is an edge, and outputs it to the edge counting circuit 511.

<Edge Detection (Extraction)>

Figure 6:
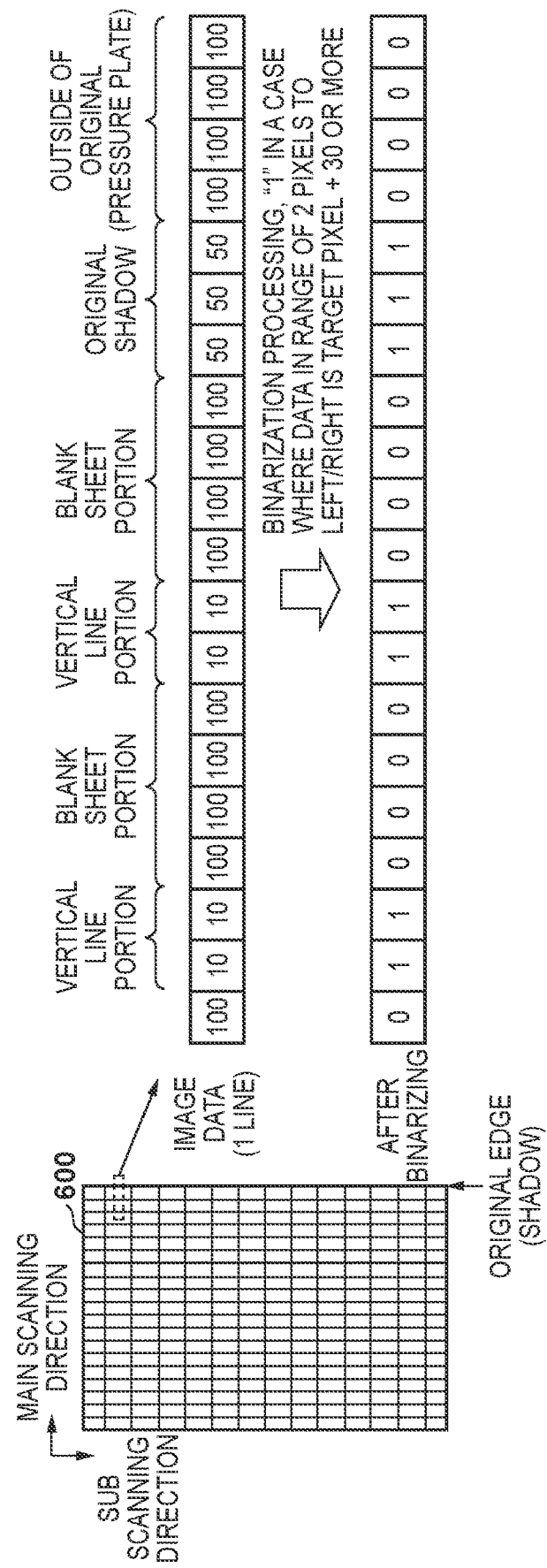
FIG. 6 is a view for illustrating the concept of edge detection.

FIG. 6 is a view for illustrating a concept of edge detection processing in the edge detection circuit 510. Here, image data of the 20 pixels on the right end, among the plurality of pixels that configure one line in image data 600, which is obtained by reading an original on which ruled lines are drawn by vertically and horizontally, is described.

The values of each pixel indicate the brightness (luminance) in each the pixels. The pixel is brighter the larger this number is. Since the portion in which the ruled lines are printed on the original is black, the reflectance of that portion is low, and the value (example: 10) of a pixel corresponding to that portion is small. Meanwhile, in the original, the reflectance is high for the blank sheet portion, and the value (example: 100) of a pixel of that portion is large. In most cases, the original is a sheet, but it has a non-negligible thickness. Accordingly, a shadow occurs at the original edge when an original is illuminated by the LED 502. Because the shadow is dark compared to the pressing surface of the pressure plate 104 and the blank sheet portion of the original, the values (example: 50) of pixels of the shadow portion become somewhat smaller.

The edge detection circuit 510 performs an edge determination for every pixel in order from the start in the main scanning direction (the left end in FIG. 6) based on the pixel values. Here, the pixel that is the target of the edge determination is called the target pixel. The edge detection circuit 510 determines whether or not the target pixel satisfies the edge condition. The edge condition is that a pixel whose value is larger than the value of a target pixel by a predetermined value or more is present in a range made up of the two pixels positioned to the right of the target pixel and the two pixels positioned to the left of the target pixel. In other words, the edge detection circuit 510 calculates differences between the target pixel and the adjacent pixels, and extracts an edge based on the differences. If the target pixel satisfies the edge condition, the edge detection circuit 510 outputs 1. If the target pixel does not satisfy the edge condition, the edge detection circuit 510 outputs 0. In other words, the edge detection circuit 510 generates edge information by binarizing the image data. A predetermined value that is the binarization reference is 30, for example. In this way, if the target pixel is darker than a pixel present in the surroundings of the target pixel, it is determined that the target pixel is an edge. In this way, the shadow of the original is also extracted as an edge.

The edge detection circuit 510 executes the edge extraction processing for a predefined number of lines. In the present embodiment, edge extraction is executed for 100 lines of image data, for example. Edge information obtained by binarizing image data in accordance with the edge condition is outputted to the edge counting circuit 511 for each line.

<Edge Counting>

Figure 7:
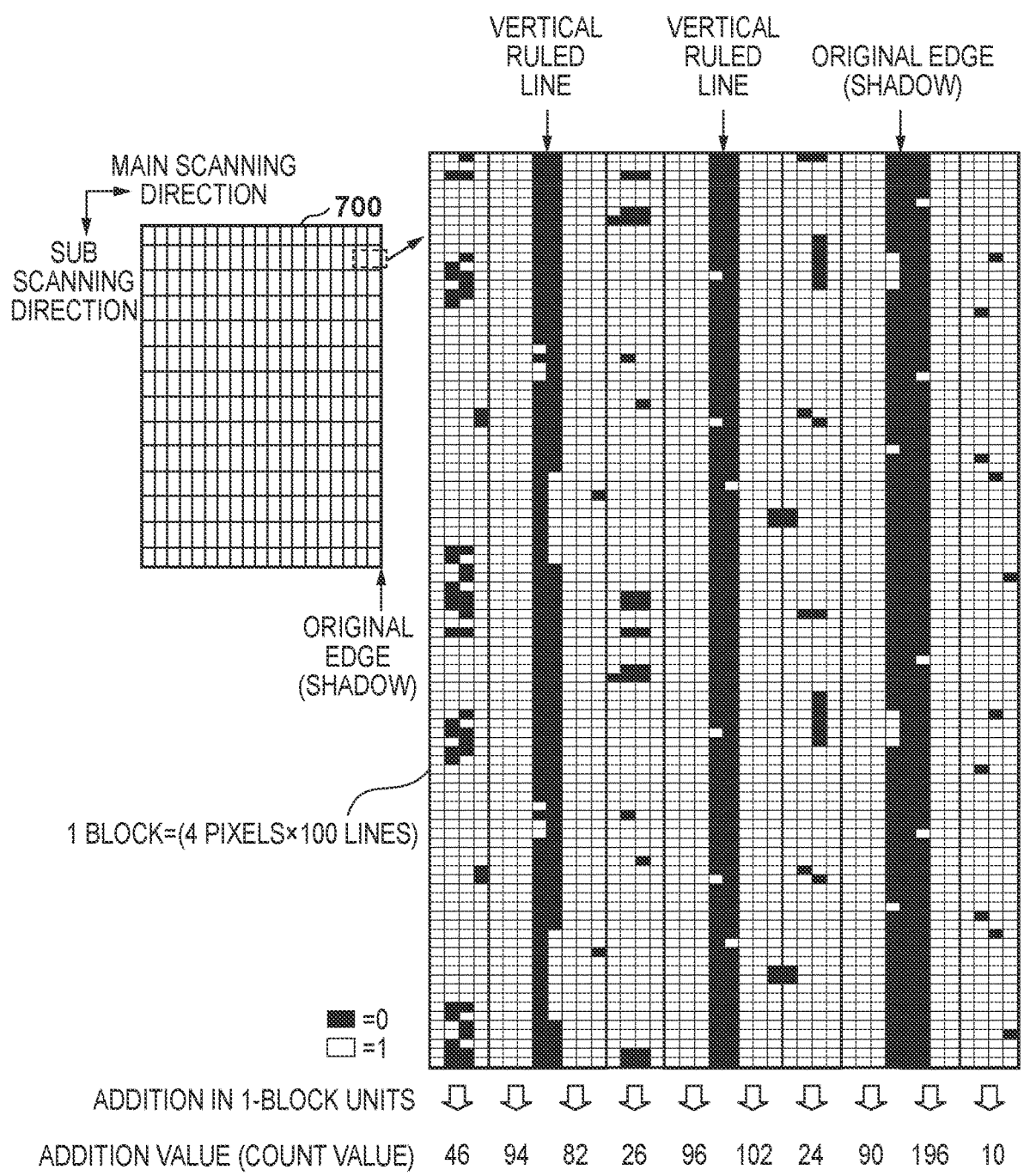
FIG. 7 is a view for illustrating the concept of edge counting.

FIG. 7 illustrates a concept of edge counting processing that the edge counting circuit 511 executes. Here, to simplify the description, binarized data for 40 pixels×100 lines on the right end in the main scanning direction in edge information 700 is described. The edge counting circuit 511 is a circuit for counting (adding) edge information outputted from the edge detection circuit 510 for each predetermined region. In the present embodiment, 4 pixels×100 lines in the main scanning direction, i.e. 400 pixels, form one block.

As FIG. 7 illustrates, a plurality of pixels lined up in the sub scanning direction, which corresponds to a vertical ruled line that is parallel to the sub scanning direction are determined to be an edge. The main scanning positions for the plurality of pixels are all the same. Similarly, a plurality of pixels lined up in the sub scanning direction, which correspond to an original edge, are determined to be an edge. The main scanning positions for the plurality of pixels are all the same. Accordingly, when the edge counting circuit 511 accumulates values of these pixels in the sub scanning direction, the count value becomes larger. In FIG. 7, the count value for a block (example: the rightmost block) in which an edge is not present among the 10 blocks is 10. Meanwhile, the count value of the second block from the right in which an original edge is present is 196.

The edge counting circuit 511 stores the edge counting results in a volatile RAM in the edge counting circuit 511. The CPU 506 both reads the result of edge counting from the volatile RAM in the edge counting circuit 511 and obtains the output of the original sensor 107. The CPU 506, based on the edge counting result and the detection result of the original sensor 107, determines the size of the original 101 placed on the original platen glass 102. The edge counting result indicates whether or not the original is protruding, and the main scanning length of the original. The detection result of the original sensor 107 indicates the sub scanning length of the original. Accordingly, the original size is decided from this information.

<Original Size Determination Processing>

Figure 8:
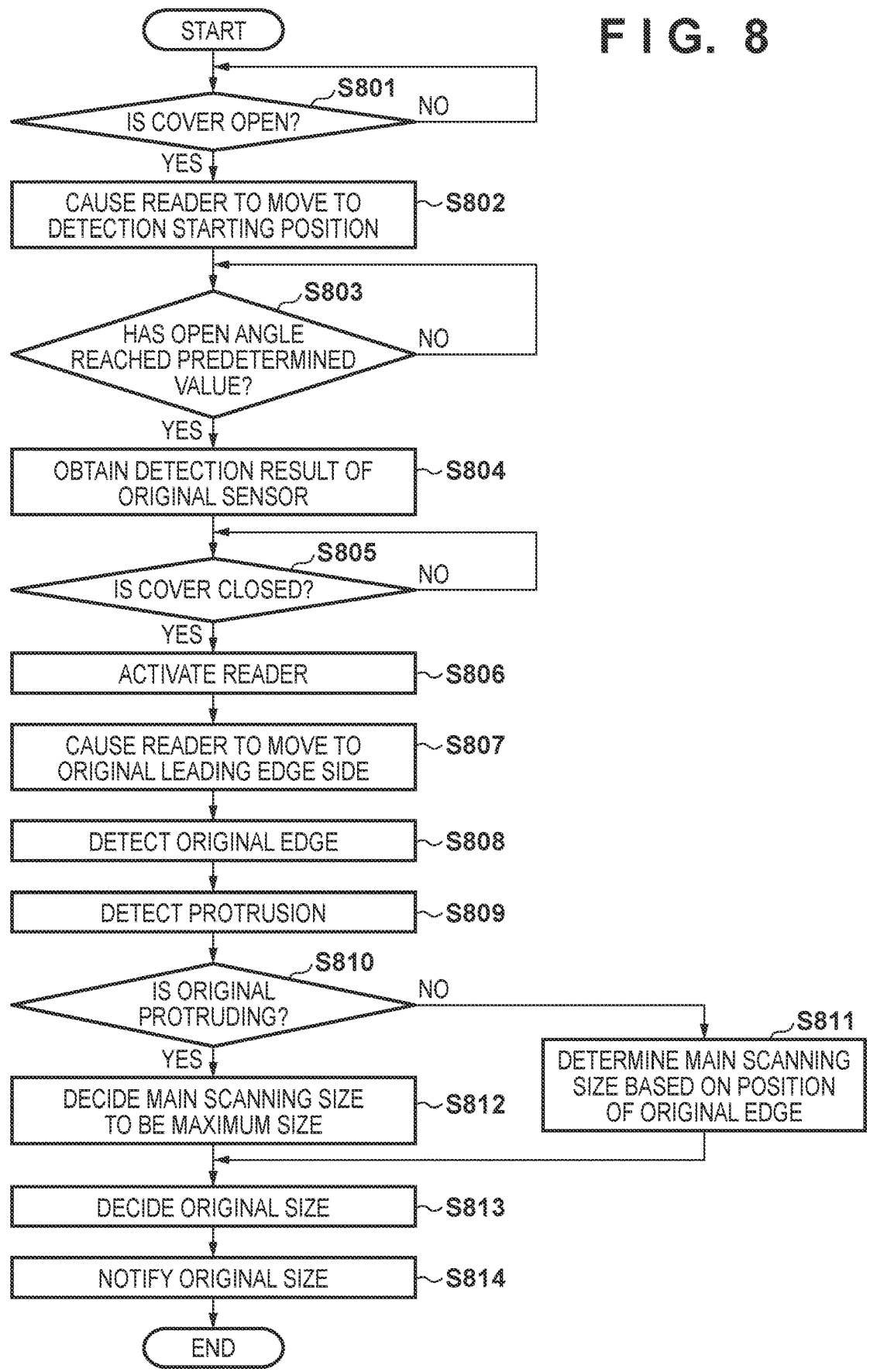
FIG. 8 is a flowchart for illustrating processing for determining an original size.

FIG. 8 is a flowchart indicating original size determination processing that the CPU 506 executes.

In step S801, the CPU 506 determines whether or not the cover 103 is open based on the output level of the open/close sensor 105. For example, the CPU 506 determines that the cover 103 is open if the output level of the open/close sensor 105 is greater than or equal to a threshold. On the other hand, the CPU 506 determines that the cover 103 is closed if the output level of the open/close sensor 105 is less than the threshold. If the cover 103 is open, it is determined that the operator wishes to place the original 101 on the original platen glass 102, and the CPU 506 advances to step S802.

Figure 9:
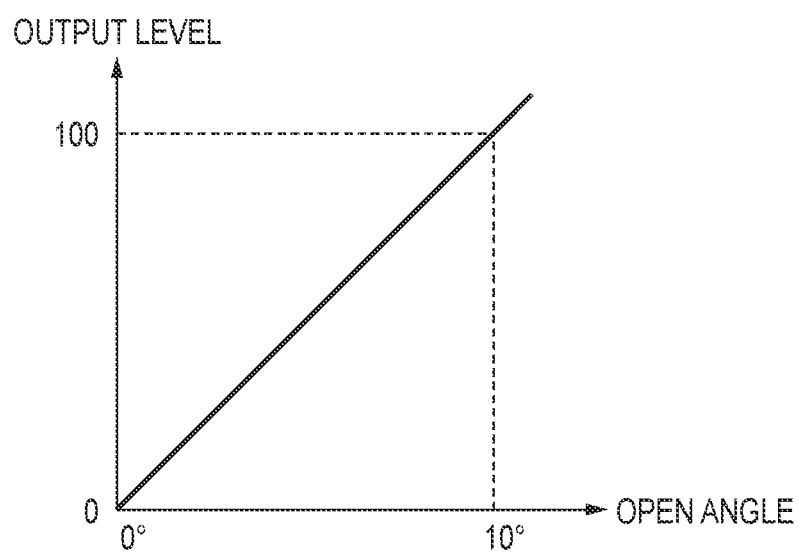
FIG. 9 is a view for illustrating output characteristics of an open/close sensor.

FIG. 9 illustrates an example of output characteristics of the open/close sensor 105. The abscissa indicates the open angle of the cover 103. The ordinate indicates the output level of the open/close sensor 105. When in a state in which the cover 103 is closed (open angle=0°), the output level is 0. If the open angle of the cover 103 is 10°, the output level is 100. The sensor for detecting the open angle of the cover 103 is not limited to the open/close sensor 105. For example, a plurality of sensors that output a binary value of High or Low may be arranged in the main scanning direction, and the CPU 506 may determine the open angle of the cover 103 in accordance with logic using the output values of the plurality of sensors. A magnetic sensor provided in the original reading apparatus 1 may detect magnetism from a magnetic material provided in the cover 103. In such a case, the CPU 506 may detect the open angle of the cover 103 based on the detection result of the magnetic sensor. The CPU 506 may convert the detection result into the open angle by referencing a table. Such a table may be stored in the nonvolatile memory 507.

The aforementioned threshold may be set to 100 which is the output level when the open angle is 10°. The CPU 506 determines that the cover 103 is open when the open angle of the cover 103 is 10° or more. In other words, when the output level is 100 or more, the CPU 506 determines that the cover 103 is open, and advances to step S802.

Figure 10:
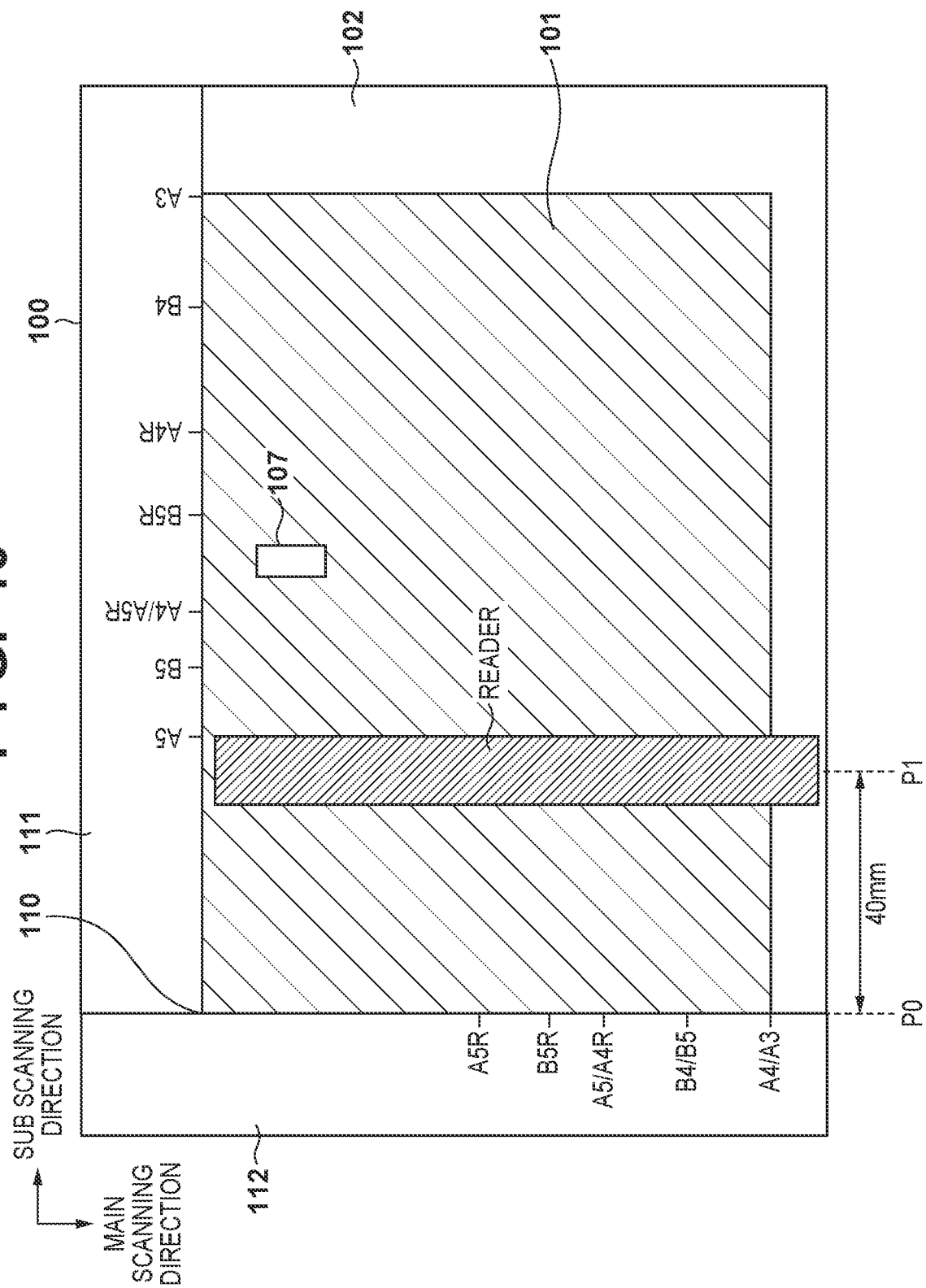
FIG. 10 is a view illustrating an original size detection starting position.

In step S802, the CPU 506 controls the motor 505, and causes the reader 106 to move to a sub scanning position (detection starting position P1) at which original size detection is started. FIG. 10 is a view illustrating schematically the detection starting position P1. The detection starting position P1 is a position separated by 40 mm in the sub scanning direction from the leading edge position P0 of the original 101. Note that the leading edge position P0 matches the position at the right end of the positioning member 112.

In step S803, the CPU 506 determines whether or not the cover 103 was closed once again before the open angle became a predetermined value (example: 10°) based on the output level of the open/close sensor 105. When the open angle becomes 10°, the CPU 506 advances to step S804.

In step S804, the CPU 506 obtains the detection result of the original sensor 107.

FIG. 11A is a side view illustrating a state in which the original 101 is not placed on the original platen glass 102. FIG. 11B is a side view illustrating a state in which the original 101 is placed on the original platen glass 102. In FIG. 11A and FIG. 11B, because operation of the original sensor 107 is illustrated schematically, the reader 106 is not drawn. The original sensor 107 is equipped with a light emitter 1101 such as an LED that emits infrared light and a light receptor 1102 such as a photosensor. When the infrared light that the light emitter 1101 emits is incident on the light receptor 1102, the original sensor 107 outputs a High-level detection signal. When the infrared light that the light emitter 1101 emits is not incident on the light receptor 1102, the original sensor 107 outputs a Low-level detection signal. In other words, the original sensor 107 is a reflective type optical sensor. A light emission device that outputs light of a wavelength other than an infrared wavelength may be used.

In a case where the open angle of the cover 103 is 10°, and the original 101 is not placed on the original platen glass 102, as FIG. 11A illustrates, the infrared light emitted from the light emitter 1101 transmits through the original platen glass 102, and is reflected by the pressure plate 104. Accordingly, infrared light is not incident on the light receptor 1102. As a result, the original sensor 107 outputs Low. Meanwhile, as illustrated in FIG. 11B, in a case where the original 101 is placed on the original platen glass 102, the infrared light emitted from the light emitter 1101 is reflected by the original 101, and is incident on the light receptor 1102. As a result, the original sensor 107 outputs High. By obtaining the output logic of the original sensor 107, the CPU 506 determines whether or not the original 101 is placed at the position of the original sensor 107. The CPU 506 holds the result of determination in a volatile RAM provided in the CPU 506.

In step S805, the CPU 506 determines whether or not the cover 103 is closed based on the detection result of the open/close sensor 105. For example, the CPU 506 determines that the cover 103 is closed when the open angle becomes 0° (in other words, the output level of the open/close sensor 105 becomes approximately 0). When the cover 103 closes, the CPU 506 advances to step S806.

In step S806, the CPU 506 activates the reader 106. The CPU 506 both causes the LED 502 to light up, and activates the image sensor 503. Accordingly, the reader 106 transitions into a state in which it can output image data.

In step S807, the CPU 506 controls the motor 505, and causes the reader 106 to move to leading edge side of the original. In other words, the reader 106 starts moving in an opposite direction to the sub scanning direction from the detection starting position P1. Such movement may also be called a backscan.

In step S808, the CPU 506 detects an original edge based on an edge count value at a predetermined timing prior to the reader 106 reaching the leading edge position P0 of the original.

In step S809, the CPU 506 detects protrusion of the original based on the edge count value.

Figure 12:
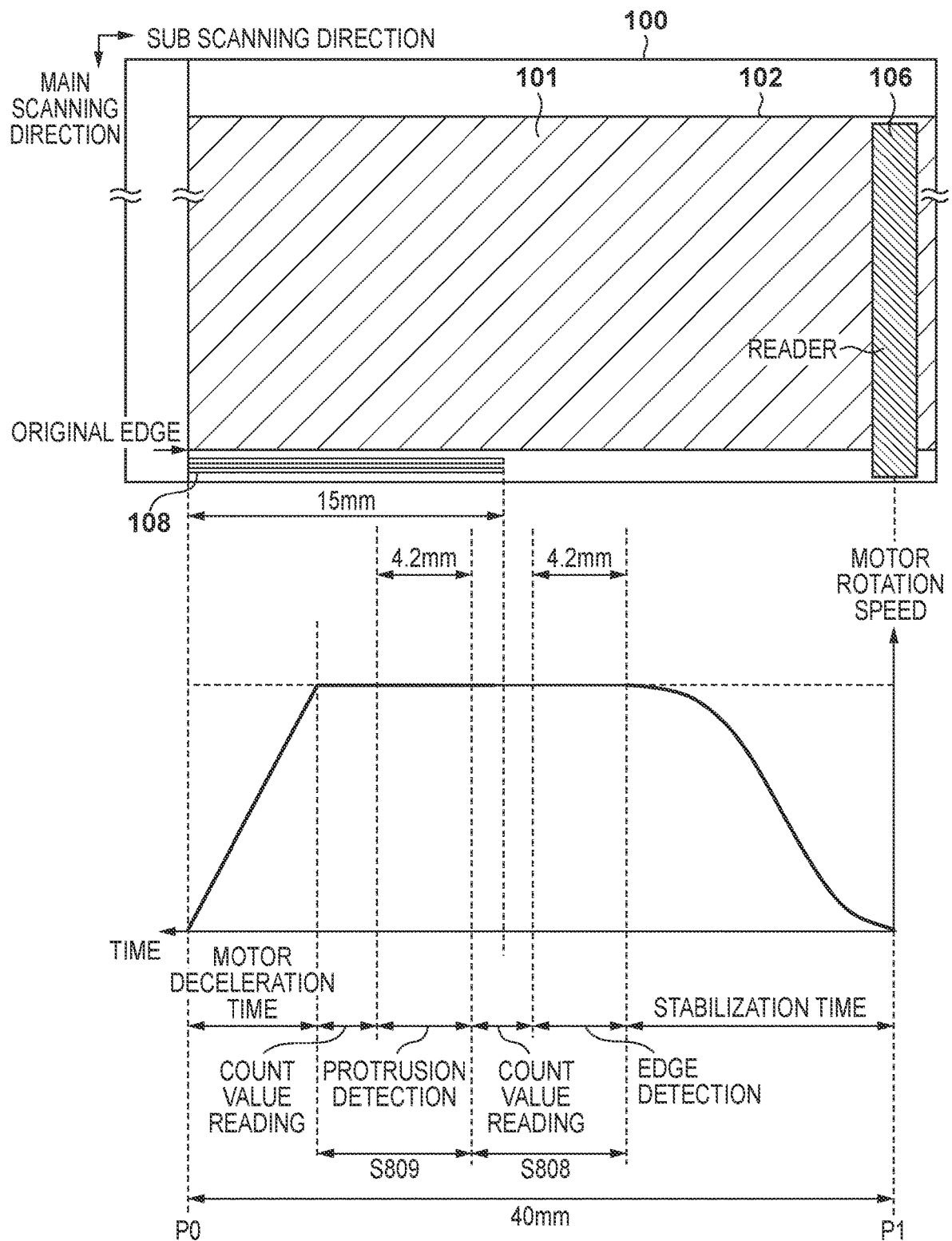
FIG. 12 is a view illustrating execution timing of edge detection and protrusion detection of an original.

FIG. 12 is a timing chart that indicates original edge detection timing and protrusion detection timing. In FIG. 12, a schematic diagram in which the original reading apparatus 1 is seen from above is illustrated above the timing chart. The origin of the timing chart of FIG. 12 is the right end, and time advances towards the left. In other words, the abscissa indicates time, and the ordinate indicates the rotation speed of the motor 505.

As described above, in step S807, the CPU 506 starts movement of the reader 106 from the detection starting position P1. While moving the reader 106 from the detection starting position P1 by a predetermined distance in the leftward direction, the rotation speed of the motor 505 is stabilized. At the point in time when the rotation speed of the motor 505 stabilizes, the CPU 506 executes original edge detection. Also, in step S808, the CPU 506 both instructs the edge detection circuit 510 to start detection and instructs the edge counting circuit 511 to start counting. Accordingly, original edge (main scanning edge) detection is executed for the original 101 by using image data of a predetermined number of lines. Here, it is assumed that the sub scanning resolution is 600 dpi. Accordingly, the sub scanning length of one line is 0.042 mm. The sub scanning length for 100 lines is 4.2 mm. The CPU 506 performs edge detection by using image data according to 100 lines. The edge counting circuit 511 executes counting for each block. As described above, one block is configured by 400 pixels (4 pixels×100 lines in the main scanning direction). Processing of edge extraction in the edge detection circuit 510, edge counting in the edge counting circuit 511, and reading the count value by the CPU 506 is included in the detection processing of step S808. As FIG. 12 illustrates, the sub scanning position at which the edge detection in step S808 is applied (a 4.2 mm width in the sub scanning direction) is a position at which the reader 106 cannot read the engraved marks 108.

Figure 13:
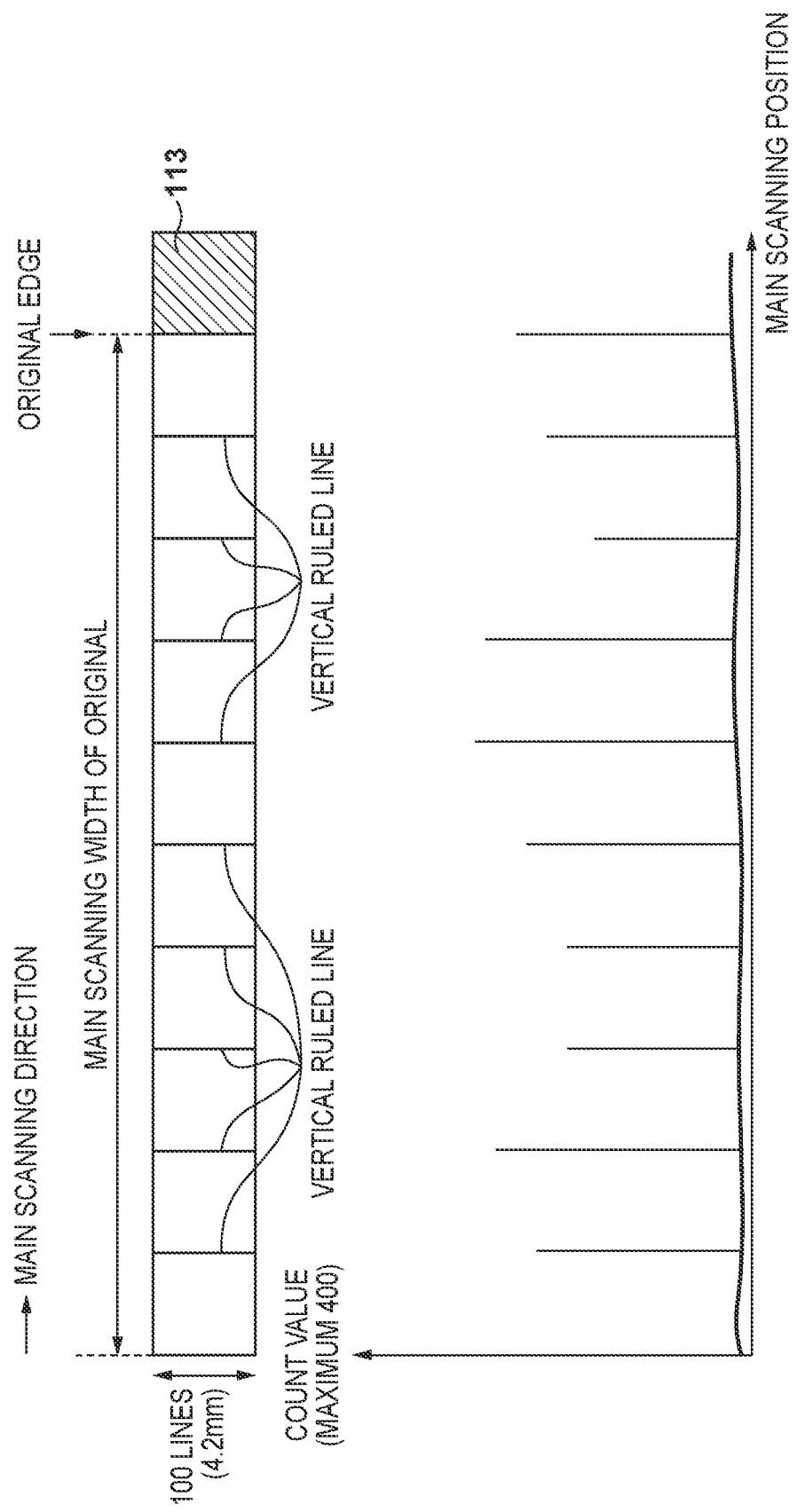
FIG. 13 is a view for illustrating a result of edge counting.

FIG. 13 illustrates an example of edge count values. As FIG. 13 illustrates, when the original 101 on which vertical ruled lines or the like are drawn is placed on the original platen glass 102, the count value becomes larger at a position of a ruled line and a position of an original edge.

When edge detection ends, the CPU 506 executes the protrusion detection of step S809. In the protrusion detection, the edge detection circuit 510 and the edge counting circuit 511 are used, similarly to in the edge detection. As FIG. 12 illustrates, in the protrusion detection, image data of 100 lines (4.2 mm) in the sub scanning direction is used, similarly to in the edge detection. The edge counting circuit 511 executes counting, treating 4 pixels×100 lines=400 pixels in the main scanning direction as one block.

Edge extraction in the edge detection circuit 510, count processing in the edge counting circuit 511, and count value read processing in the CPU 506 is included in step S809, as FIG. 12 illustrates. As FIG. 12 illustrates, the sub scanning position at which the protrusion detection in step S809 is applied (a 4.2 mm width in the sub scanning direction) is a position at which the reader 106 can read the engraved marks 108.

Figure 14:
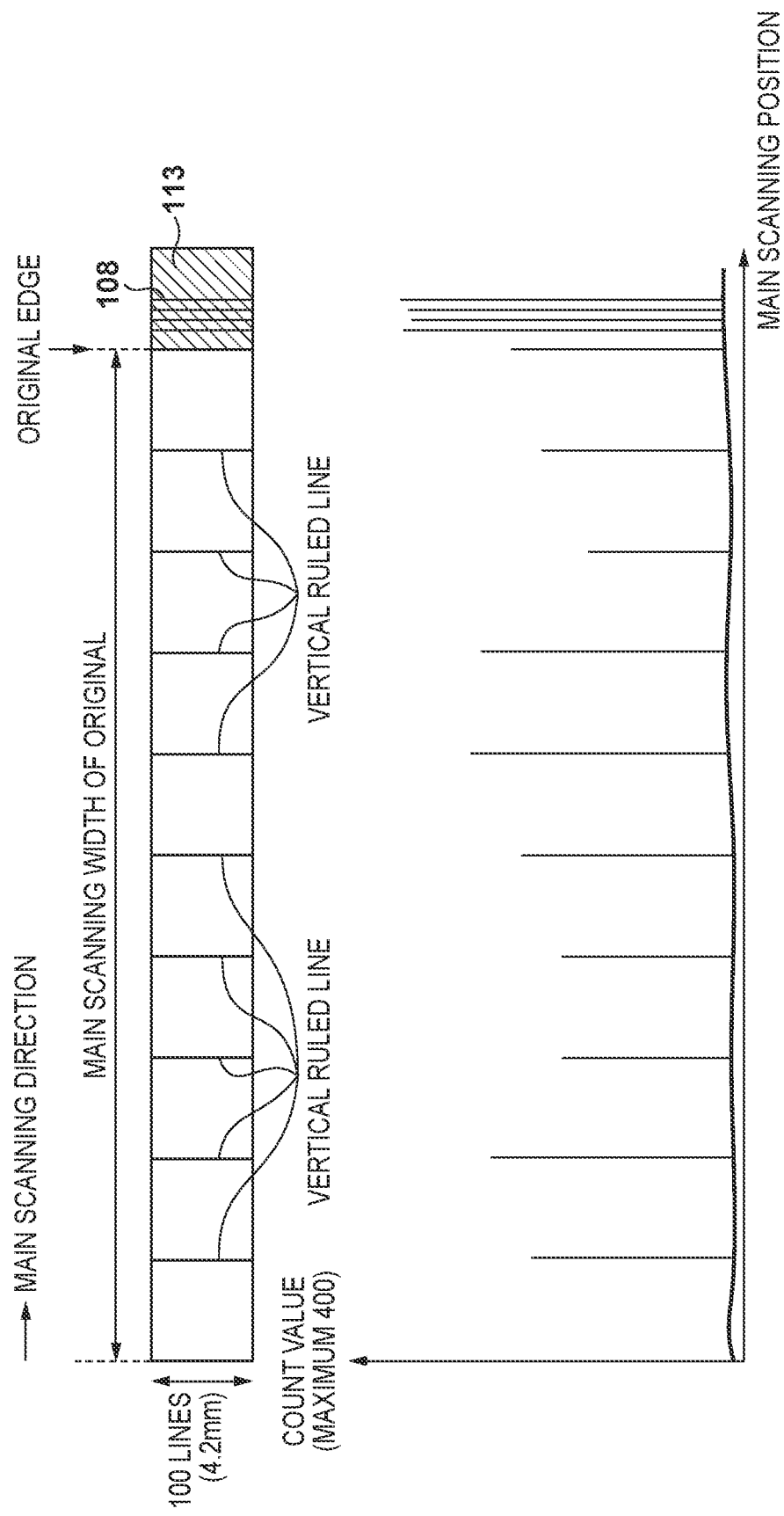
FIG. 14 is a view for illustrating a result of edge counting.

FIG. 14 illustrates an example of edge count values. In addition to a position of a ruled line and a position of a main scanning edge of the original, the count value becomes larger even at a position of the engraved marks 108, as FIG. 14 illustrates. The engraved marks 108 are engraved in the pressure plate 104 at a depth of 0.5 mm. Accordingly, shadows according to the engraved marks 108 occur upon illumination by the LED 502. Since these shadows are extracted as edges, the edge count values become larger. In the CPU 506, the edge count value for each block is held in a volatile RAM which is inside of the CPU 506.

In step S810, the CPU 506 determines whether or not the original 101 is protruding from the original platen glass 102 based on the edge count values obtained by the protrusion detection. If the original 101 is protruding from the original platen glass 102, the CPU 506 advances to step S812. Meanwhile, if the original 101 is not protruding from the original platen glass 102, the CPU 506 advances to step S811.

Figure 15A:
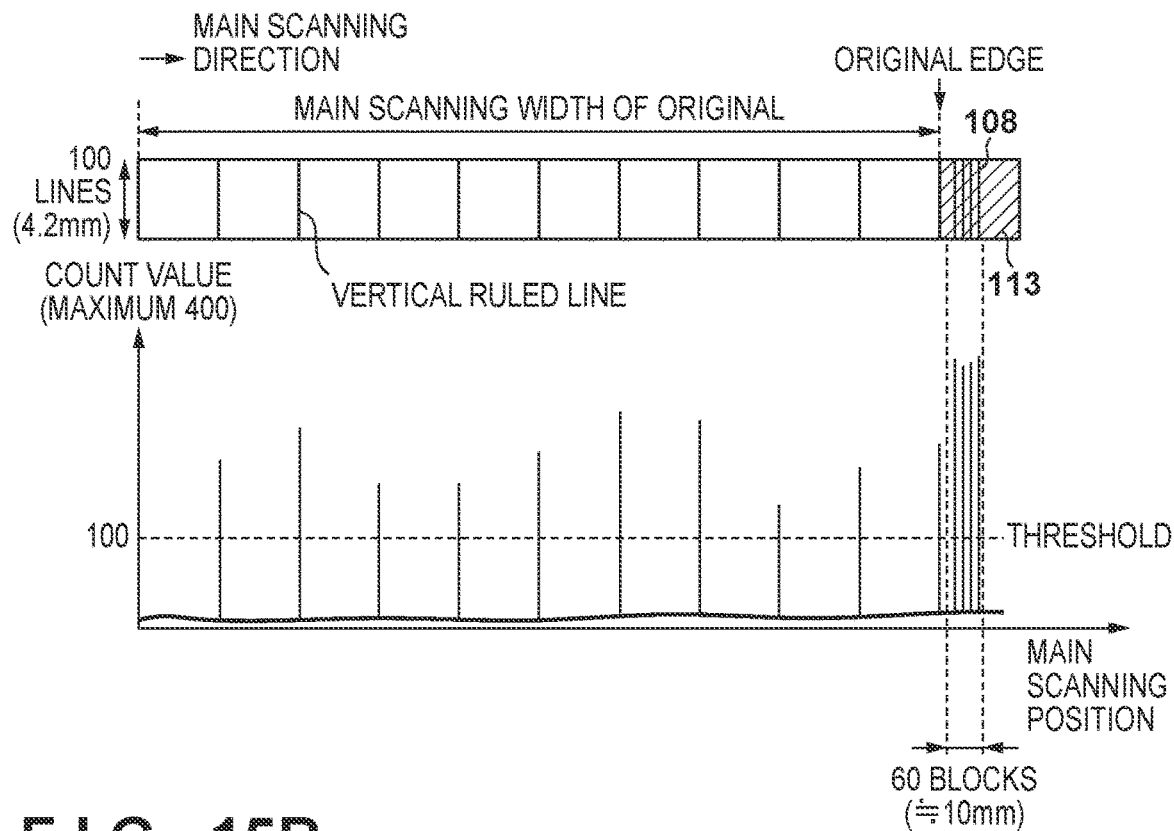
FIGS. 15A and 15B are views for describing a concept of the protrusion detection.
Figure 15B:
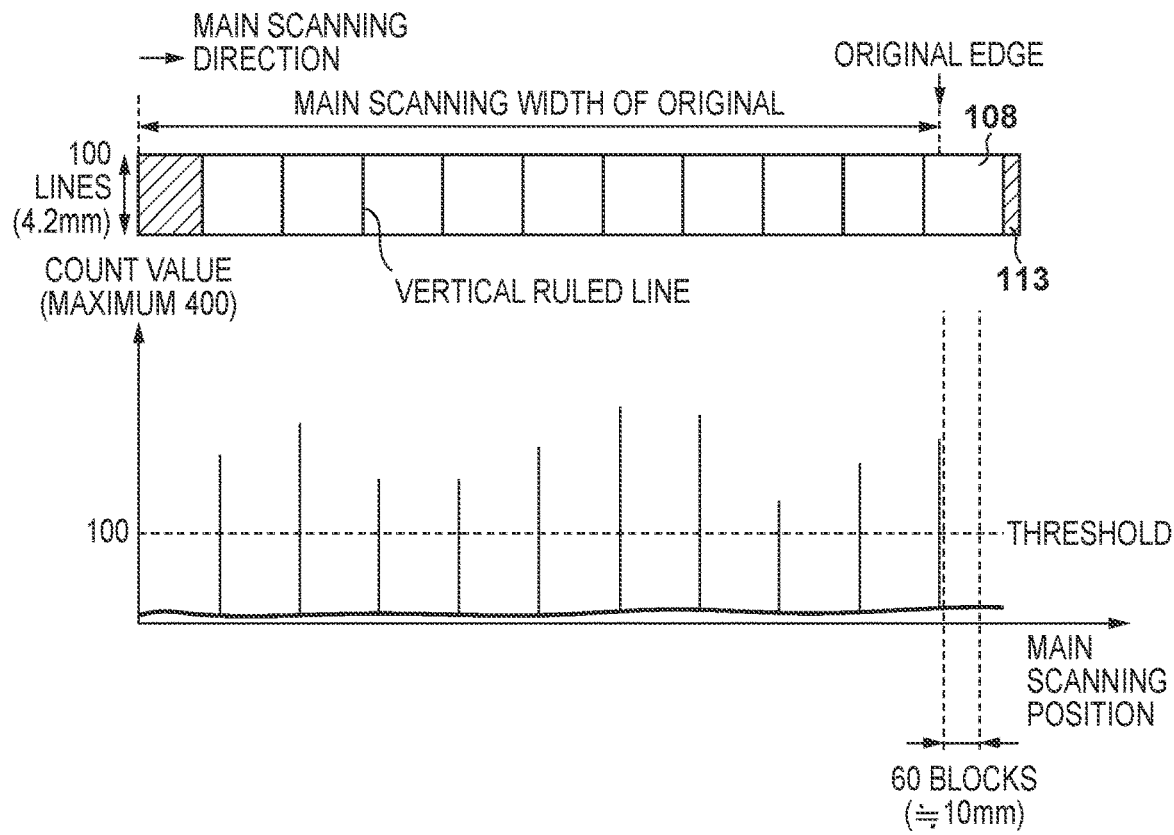

FIG. 15A illustrates edge count values for when the original 101 is not protruding. FIG. 15B illustrates edge count values for when the original 101 is protruding. The CPU 506 defines a main scanning position at which the engraved marks 108 can be read when the cover 103 is closed. The range of 10 mm (60 blocks) illustrated on the right end of FIG. 15A and FIG. 15B is a position at which the engraved marks 108 can be read. Hereinafter, this range will be called the engraved range.

The CPU 506 compares the edge count value for each block (400 pixel units) in the engraved range with a threshold. If even one block whose count value exceeds the threshold is present in the engraved range, the CPU 506 determines that the original 101 is protruding. The threshold for determining protrusion is, for example, 100. In FIG. 15A, the original 101 of an A3 size is correctly aligned, and placed on the original platen glass 102. Accordingly, the reader 106 can read the engraved marks 108. Accordingly, one or more blocks whose edge count value exceeds the threshold are present in the engraved range. Thus, the CPU 506 determines that the original 101 is not protruding. When it determines that the original is not protruding, the CPU 506 advances to step S811.

FIG. 15B illustrates a case where the original 101 of the A3 size is placed such that it protrudes in the main scanning direction from the original platen glass 102. As FIG. 15B illustrates, when the original 101 is placed such that it protrudes from the original platen glass 102, the engraved marks 108 are covered and hidden by the original 101. Accordingly, the reader 106 ceases to be able to read the engraved marks 108. The result of this is that not even one block whose edge count value exceeds the threshold is present within the engraved range. Thus, the CPU 506 determines that the original 101 is protruding. When it determines that the original is protruding, the CPU 506 advances to step S812.

Here, four engraved marks 108 whose sub scanning length is 15 mm are exemplified. There is a reason for such dimensions of the engraved marks 108. There are times when the attachment position of the pressure plate 104 is displaced somewhat in the main scanning direction and/or the sub scanning direction in relation to the reader 106. Accordingly, the dimensions of the engraved marks 108 are determined in consideration of such assembly tolerance. Accordingly, when the cover 103 is closed, the engraved marks 108 provided on the pressure plate 104 are positioned at a position at which the reader 106 can read the engraved marks 108.

Furthermore, by making the sub scanning length of the engraved marks 108 longer, the distance (range) in which the reader 106 can detect the engraved marks 108 in the sub scanning direction becomes longer. When the sub scanning length of the engraved marks 108 is made to be longer than a few mm, it becomes less likely that small contaminants and dirt that are attached to the original platen glass 102 or the pressure plate 104 will be erroneously detected as the engraved marks 108. In other words, since the number of pixels included in one block increases, the influence of dirt or the like is reduced.

The engraved marks 108 that are provided on the pressure plate 104 here are given as an example of a mark for protrusion detection. As described above, when the attachment position of the pressure plate 104 is displaced from the ideal position (the position in the design), some of the plural engraved marks 108 may be positioned toward the inside with respect to the end of an A3/A4 original. Hypothetically, assume that the marks were a printed line or shape. In particular, with a thin original 101, since the mark would appear through the original 101, the reader 106 would read the mark. This will cause the protrusion detection accuracy to deteriorate. On the other hand, the engraved marks 108 are an unevenness that is formed in the pressure plate 104. Also, the color of the engraved marks 108 is the same as the color of the pressure plate 104. Accordingly, the engraved marks 108 tend not to appear through the original 101 since the unevenness of the engraved marks 108 is covered when the original 101 is placed. In other words, the engraved marks 108 are advantageous over a printed mark in that they cause the protrusion detection accuracy to improve.

In step S811, the CPU 506 determines the main scanning size (main scanning length) of the original 101 based on the position of the original edge. The CPU 506 determines the main scanning size of the original 101 by using an edge count value indicating the position of an original edge obtained in step S808.

FIG. 16 is a view for describing a method of determining a main scanning size. The CPU 506 defines a determined region according to an original size that can be read by the original reading apparatus 1. For example, the original reading apparatus 1 can read A3, A4, A5, B4, B5, and B6 originals. Among these sizes, the A3 and A4 set, the B4 and B5 set, the A5 and A4R set, and B6 and B5R set are each pairs of original sizes whose main scanning lengths are the same. Five types of sizes should be determined here, adding A5R to these four sets. Accordingly, a determination region corresponding to each main scanning length is defined. In FIG. 16, a region I is a region for determining the A3/A4 sizes. A region II is a region for determining the B4/B5 sizes. A region III is a region for determining the A5/A4R sizes. A region IV is a region for determining the B6/B5R sizes. A region V is a region for determining the A5R size.

The CPU 506 compares the edge count value of each block obtained in step S808 with a threshold defined in advance, and binarizes the edge count values. As FIG. 16 illustrates, a threshold for determining the main scanning size is set at 150. The CPU 506 determines whether or not there is a block in which the count value exceeds the threshold in any region among the region I through the region V. The CPU 506 identifies a region positioned outermost among the regions in which one or more blocks having a count value that exceeds the threshold are present. Furthermore, the CPU 506 decides the main scanning size associated with the identified region as the main scanning size of the original 101. In the example that FIG. 16 illustrates, the region II, the region III, and the region V have blocks whose count value exceeds the threshold. The CPU 506 determines that the main scanning edge of the original 101 is present in the region II which is positioned most to the outside in the main scanning direction among these regions. In other words, the CPU 506 determines the main scanning size of the original 101 to be the B4/B5 sizes corresponding to the region II. At that point in time, the sub scanning size of the original 101 is not yet decided.

Incidentally, since vertical lines such as a ruled line or a character are present on the original 101, these vertical lines end up being determined as edges. In FIG. 16, the edges detected in the region III and the region V can be considered to be vertical lines. The main scanning edge of the original 101 is always present more to the outside of edges due to vertical lines. For this reason, the edge positioned outermost among the extracted plurality of edges is the main scanning edge of the original 101. Using this principle, the main scanning edge of the original 101 is identified, and the main scanning size is determined.

In step S812, the CPU 506 decides that the main scanning size of the original 101 placed such that it is protruding is the maximum size. In other words, it is decided that the main scanning size of the original 101 is the A3/A4 size which is the maximum main scanning size that the original reading apparatus 1 can read.

In step S813, the CPU 506 decides the original size based on the main scanning size of the original 101 and the output logic of the original sensor 107. As is described in FIG. 2, the original sensor 107 is arranged at a position at which it can distinguish between a plurality of original sizes whose main scanning sizes are the same but whose sub scanning sizes differ.

FIG. 17 is a view illustrating a method of deciding an original size. If the main scanning edge is detected in the region II, and the output logic of the original sensor 107 is High, the CPU 506 decides the original size to be the B4 size. If the main scanning edge is detected in the region II, and the output logic of the original sensor 107 is Low, the CPU 506 decides the original size to be the B5 size. Assume that the original is protruding (region I), the main scanning size is the A3/A4 size, and the output logic of the original sensor 107 is High. In such a case, the CPU 506 decides the original size to be the A3 size. Assume that the original is protruding (region I), the main scanning size is the A3/A4 size, and the output logic of the original sensor 107 is Low. In such a case, the CPU 506 decides the original size to be the A4 size. Note that the size table used for deciding the original size illustrate in FIG. 17 may be stored in the nonvolatile memory 507.

In step S814, the CPU 506 notifies the original size to the operator by outputting the decided original size to a display apparatus of the console 501. The CPU 506 may output the decided original size to a printer.

Here, an edge is extracted based on the difference between the target pixel value and peripheral pixel values. However, since the present invention is not influenced by the method of extracting the edge, another edge extraction method may be employed.

Here, based on whether or not the engraved marks 108, which are grooves or the like provided in the pressure plate 104, are included in an image obtained from the original 101, it is determined whether or not the original 101 is placed so as to protrude from the original platen glass 102. Also, the engraved marks 108 are being used for deciding the main scanning length of the original 101 (may also be called the main scanning width or the main scanning size). By employing such engraved marks 108, erroneous detection of the original size even in a case where the original 101 is placed so as to protrude from the original platen glass 102 is reduced.

Often the operator who placed the original 101 so as to protrude from the original platen glass 102 typically wishes for an original reading at the maximum size. Accordingly, in a case where protrusion of the original 101 is detected, the CPU 506 decides the main scanning size of the original 101 to be the maximum main scanning size that the original reading apparatus 1 supports. Accordingly, usability is improved because the effort by the operator in designating the size of the original that is protruding is eliminated.

Second Embodiment

In the first embodiment, there is a feature in that the main scanning size is decided to be the maximum size when protrusion of the original is detected. In the second embodiment, there is a feature in that the main scanning size is decided to be an indefinite size when protrusion of the original is detected. In the second embodiment, description of configurations and processes that are common to the first embodiment are omitted to avoid repetition.

Figure 18:
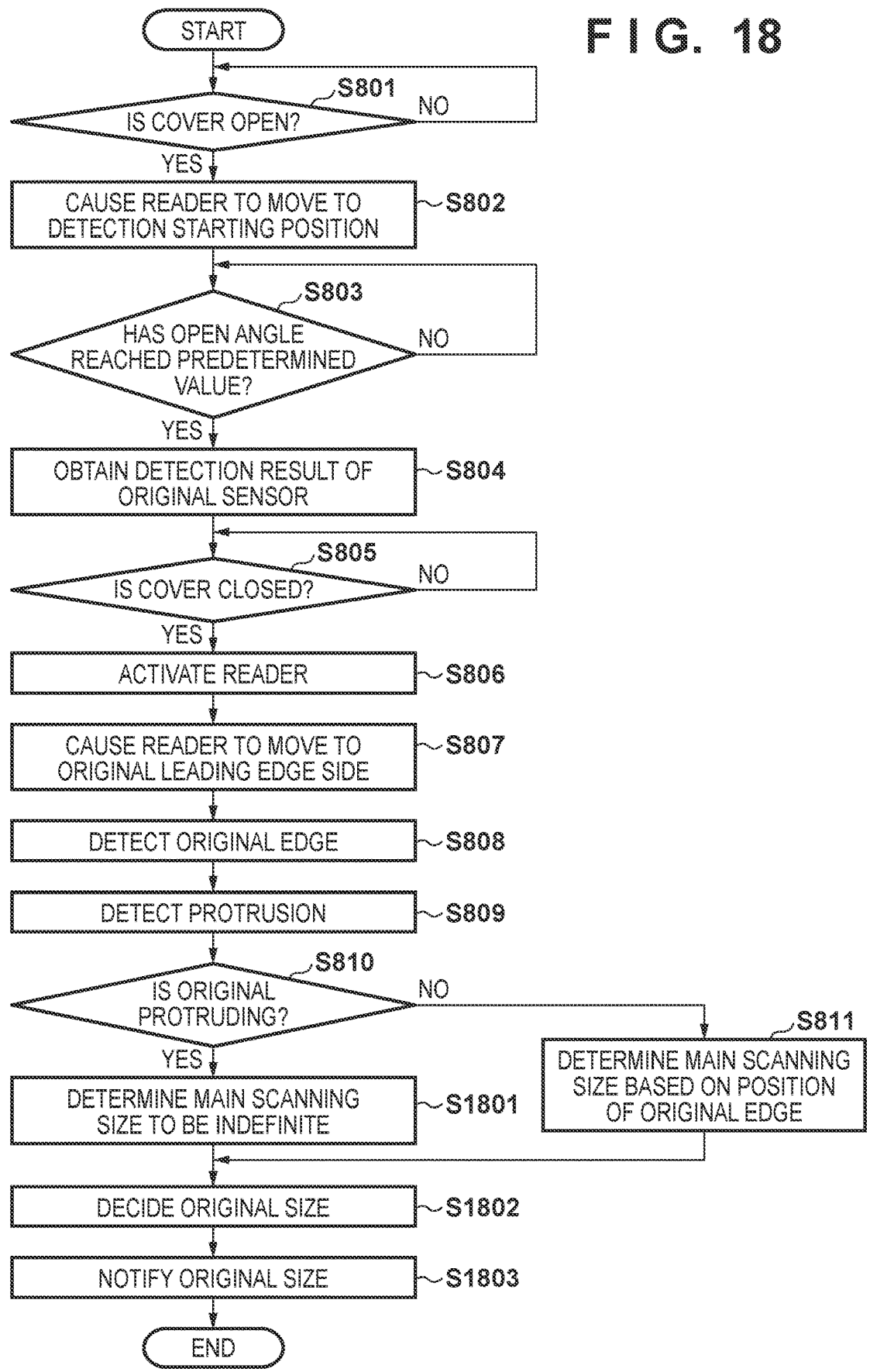
FIG. 18 is a flowchart for illustrating processing for determining an original size.

FIG. 18 is a flowchart indicating original size determination processing in the second embodiment. From step S801 to step S811 in the second embodiment is the same as the processing in the first embodiment. However, when protrusion of the original is detected in step S810, the CPU 506 advances to step S1801.

In step S1801, the CPU 506 determines the main scanning size of the original 101 to be indefinite, and advances to step S1802.

Step S1802 is processing similar to the above-described step S813. However, in a case where the main scanning size is indefinite, the CPU 506 determines the original size to be unknown (indefinite) without relying on the output logic of the original sensor 107. For the size to be unknown means that the CPU 506 could not decide the original size.

FIG. 19 illustrates an example of a size table that can be used to decide the original size. Such a size table may be stored in the nonvolatile memory 507. The CPU 506, by referencing the size table, obtains indefinite (unknown) as the original size corresponding to when the main scanning size is indefinite.

Step S1803 is processing similar to step S814. The CPU 506 notifies the original size to the operator by outputting the decided original size to a display apparatus of the console 501. In a case where the original size is indefinite, a message indicating that the original size is indefinite is displayed on the console 501. Also, the CPU 506 may display on the console 501 a message prompting the operator to designate or input the original size. The CPU 506 decides the original size designated by the operator through the console 501 as the original size of the original 101, and outputs it to a printer or the like. Note that configuration may be such that only the main scanning size is inputted by the operator.

In this way, when protrusion of the original is detected, it is possible to notify the operator that the original size is unknown. By this, the operator can recognize protrusion of the original or can understand that the original reading apparatus 1 could not identify the original size. Since the operator knows the original size of the original 101, the CPU 506 may accept a designation of the original size by the operator. Accordingly, it should be possible to decide the original size accurately. As a result, execution of an original reading of an original size that the operator does not desire becomes less likely.

Third Embodiment

In the first embodiment, the engraved marks 108 are employed as a mark that is useful in detecting protrusion. However, since it is sufficient if it is possible to detect protrusion of the original by analysis of an image obtained by the reader 106 reading the original 101, the mark may be marks other than the engraved marks 108. Also, the thickness of the pressure plate 104 must be larger than the depth of the engraved marks 108 in order to provide the engraved marks 108. The manufacturing cost increases if the thickness of the pressure plate 104 is increased. Accordingly, to reduce the manufacturing cost, it is advantageous to make the pressure plate 104 a thin sheet-shaped pressure plate. Accordingly, in the third embodiment, a mark that is stuck to the pressure plate is employed as a mark for protrusion detection.

Figure 20B:
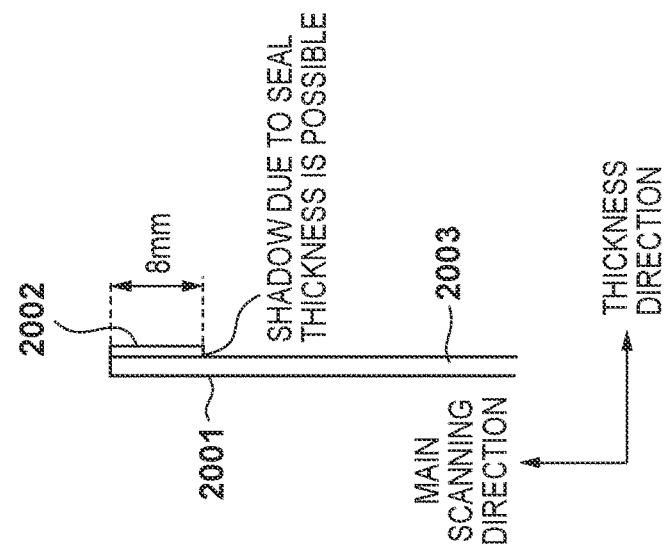
FIGS. 20A and 20B are views for illustrating marks.
Figure 20A:
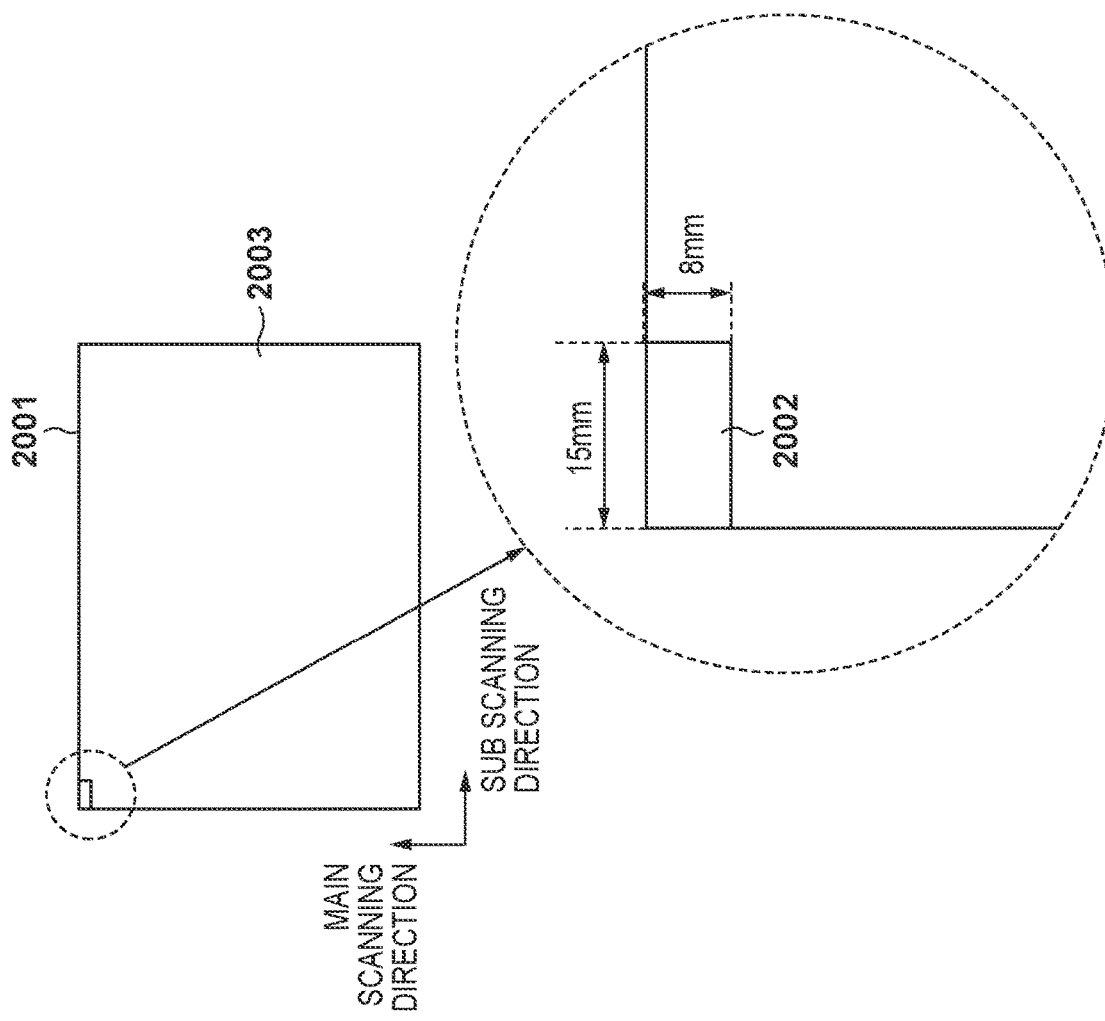

FIG. 20A illustrates a pressing surface 2003 of a sheet-shaped pressure plate 2001. A seal 2002 is a sheet-shaped flat member such as a sticker on one surface of which an adhesion member is applied. The color of the other surface of the seal 2002 may be the same as the color of the pressing surface 2003, or may be different. The seal 2002 is stuck to a position that is approximately the same as the position at which the engraved marks 108 are provided. In other words, the position at which the seal 2002 is stuck is at an end of the pressing surface 2003. The pressing surface 2003 has four corners, and one corner among these is closest to the alignment origin 110. The position at which the seal 2002 is stuck is close to another corner that is closest from this corner. The thickness of the seal 2002 is assumed to be smaller (thinner) than the depth of the engraved marks 108. The longer side of the seal 2002 is parallel to the sub scanning direction, and the shorter side is parallel to the main scanning direction. The length of the longer side is 15 mm, for example. The length of the shorter side is 8 mm, for example. In other words, the position at which the size of the seal 2002 is stuck is a position at which the seal 2002 is not hidden by an original of the A3 size that is correctly aligned.

FIG. 20B is a cross-sectional view of the seal 2002. The seal 2002 is configured by a member that is thin compared to the thickness of the pressure plate 2001, but it has a non-negligible thickness. In other words, a step occurs between the pressing surface 2003 and the seal 2002. When an illumination light is irradiated by the LED 502, a shadow due to the thickness of the seal 2002 occurs in the proximity of the longer side positioned more to the inside among the two longer sides of the seal 2002. Accordingly, this shadow is extracted as an edge in the image obtained from the original 101.

FIG. 21 illustrates a positional relationship between the pressure plate 2001, the original 101 of the A3 size, the seal 2002, and the readable range 113 when the cover 103 is closed. The side of the seal 2002 that brings on the aforementioned shadow is positioned more to the outside in the main scanning direction than the longer side of an original of the maximum size (example: A3) that the original reading apparatus 1 supports. Furthermore, the side of the seal 2002 that brings on the shadow is positioned within the readable range 113. By such a seal 2002 being stuck to the pressing surface 2003, the reader 106 can read the shadow. Also, the edge produced by the shadow can be used for protrusion detection.

By employing the seal 2002 as a mark for protrusion detection in this way, protrusion of the original becomes detectable. Also, it becomes possible to decide the original size accurately as described in the first and second embodiments. Furthermore, by employing the seal 2002, it is possible to employ a pressure plate 2001 that is thinner compared to the thickness of the pressure plate 104, and the manufacturing cost will be reduced.

Fourth Embodiment

The mark of the fourth embodiment is a shape that can be formed by printing or painting. Accordingly, the mark of the fourth embodiment is common to the seal 2002 in that it is a mark that can be applied to a thin pressure plate, but it can further reduce the manufacturing cost. In other words, there is a non-negligible cost in the member for forming the seal 2002, but the mark of the fourth embodiment is of a lower cost.

FIG. 22 illustrates a pressing surface 2203 of a pressure plate 2201. At an end of the pressing surface 2203, four printed lines 2202 functioning as marks for protrusion detection are printed. The printed lines 2202 are formed to be parallel with the sub scanning direction, and their length is 15 mm. Also, the width of the printed lines 2202 in the main scanning direction is 0.5 mm. An interval between two adjacent printed lines 2202 is 2 mm. In other words, the engraved marks 108 are replaced with the printed lines 2202.

Figure 23:
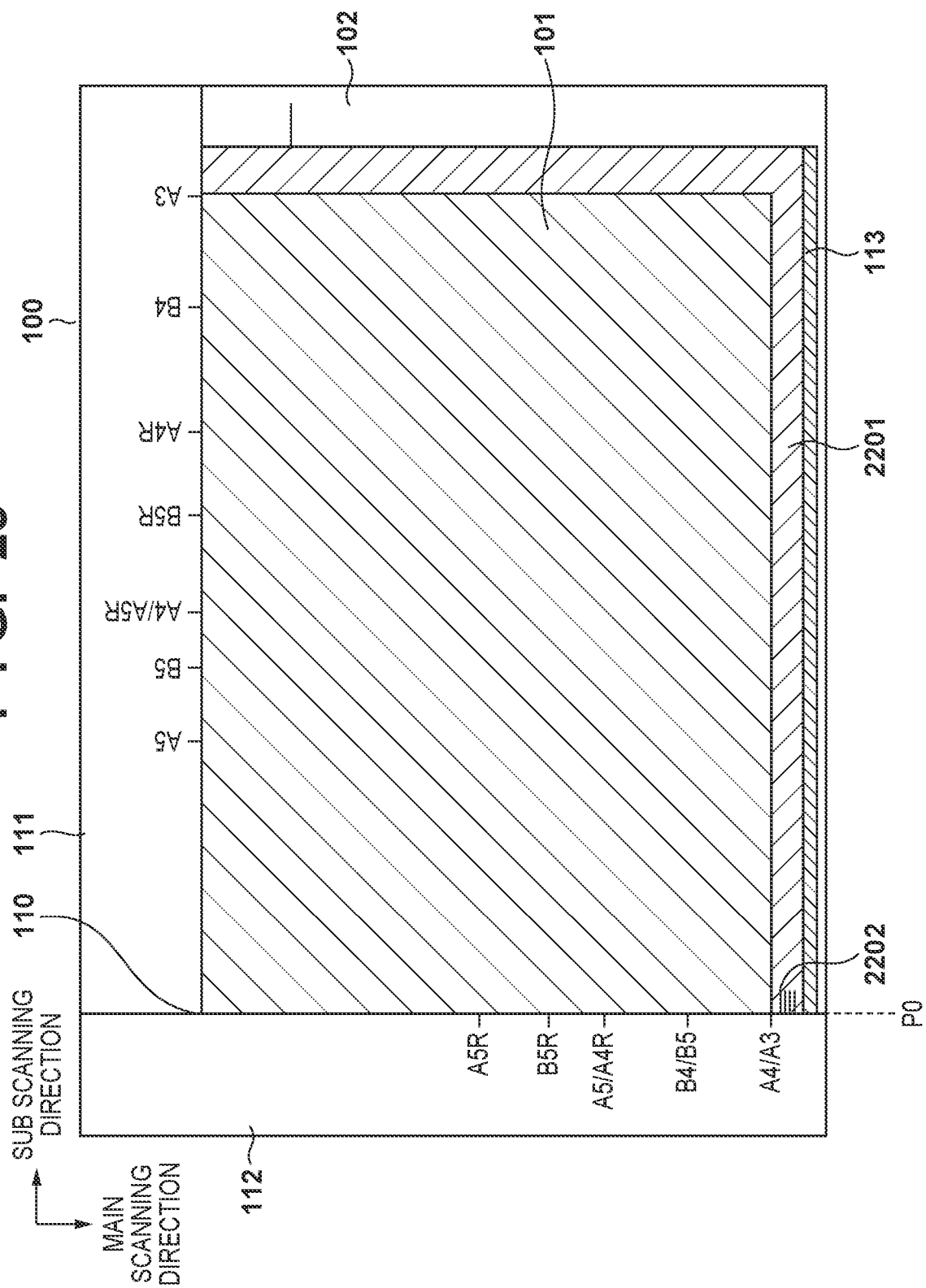
FIG. 23 is a view for describing the position of a mark.

FIG. 23 illustrates a positional relationship between the pressure plate 2001, the original 101 of the A3 size, the printed lines 2202, and the readable range 113 when the cover 103 is closed. The printed lines 2202 are positioned more to the outside in the main scanning direction than the longer side of an original of the maximum size (example: A3) that the original reading apparatus 1 supports. Furthermore, the printed lines 2202 are positioned within the readable range 113. In other words, the printed lines 2202 are arranged at a position that is not hidden by the original 101 of the A3 size that is correctly aligned. By the reader 106 reading the printed lines 2202, an edge is produced in the image similarly to the engraved marks 108. Accordingly, by extracting this edge, the CPU 506 is enabled to detect protrusion of the original 101.

Note that the color of the printed lines 2202 need not be black, and it is sufficient if it is a color that is advantageous for edge detection. For example, the color of the printed lines 2202 may be as light a gray as possible in the range in which it can be detected as an edge by the edge detection circuit 510. As described above, when the original 101 is thin, there is the possibility that the printed lines 2202 will be seen through the original 101. The printed lines 2202 influence the image the closer the tone of the printed lines 2202 is to a maximum tone (in other words, the darker it is). Accordingly, gray may be employed as the color of the printed lines 2202. The tone (density) of gray is determined to be a level at which it can be detected as an edge by the edge detection circuit 510.

By employing the printed lines 2202 as the mark in this way, it becomes possible to reduce the costs associated with the mark. Also, compared to the pressure plate 104 on which the engraved marks 108 are formed, a thinner, lower cost pressure plate 2201 can be employed. Other effects in the fourth embodiment are common to those of the first through third embodiments.

CONCLUSION

The cover 103 is one example of an open/close unit configured to be able to open/close with respect to the platen. The open/close unit may be the Auto Document Feeder (ADF) that can feed the original to the image reading position of the reader 106. The original platen glass 102, as described above, is one example of a platen that is fixed to the housing 100 and that has a transparency. The housing 100 is one example of a support that supports the original platen glass 102. The original platen glass 102 may be a resin member having a transparency. The pressure plate 104 is one example of a pressure plate that presses the original 101 in relation to the original platen glass 102 in a case where the pressure plate is in a closed position with respect to the platen. The reader 106 is one example of a reader that is arranged within the housing 100, and is for reading the original 101 which is placed on the original platen glass 102. The engraved marks 108, the seal 2002, and the printed lines 2202 are examples of a mark that is formed on the pressing surface of the pressure plate and is for detecting that the original 101 is protruding from the readable range 113 of the reader 106. Note that the mark may be a three-dimensional shape, a planar shape, a line, or the like, having a side that is parallel to the sub scanning direction, for example.

Figure 24:
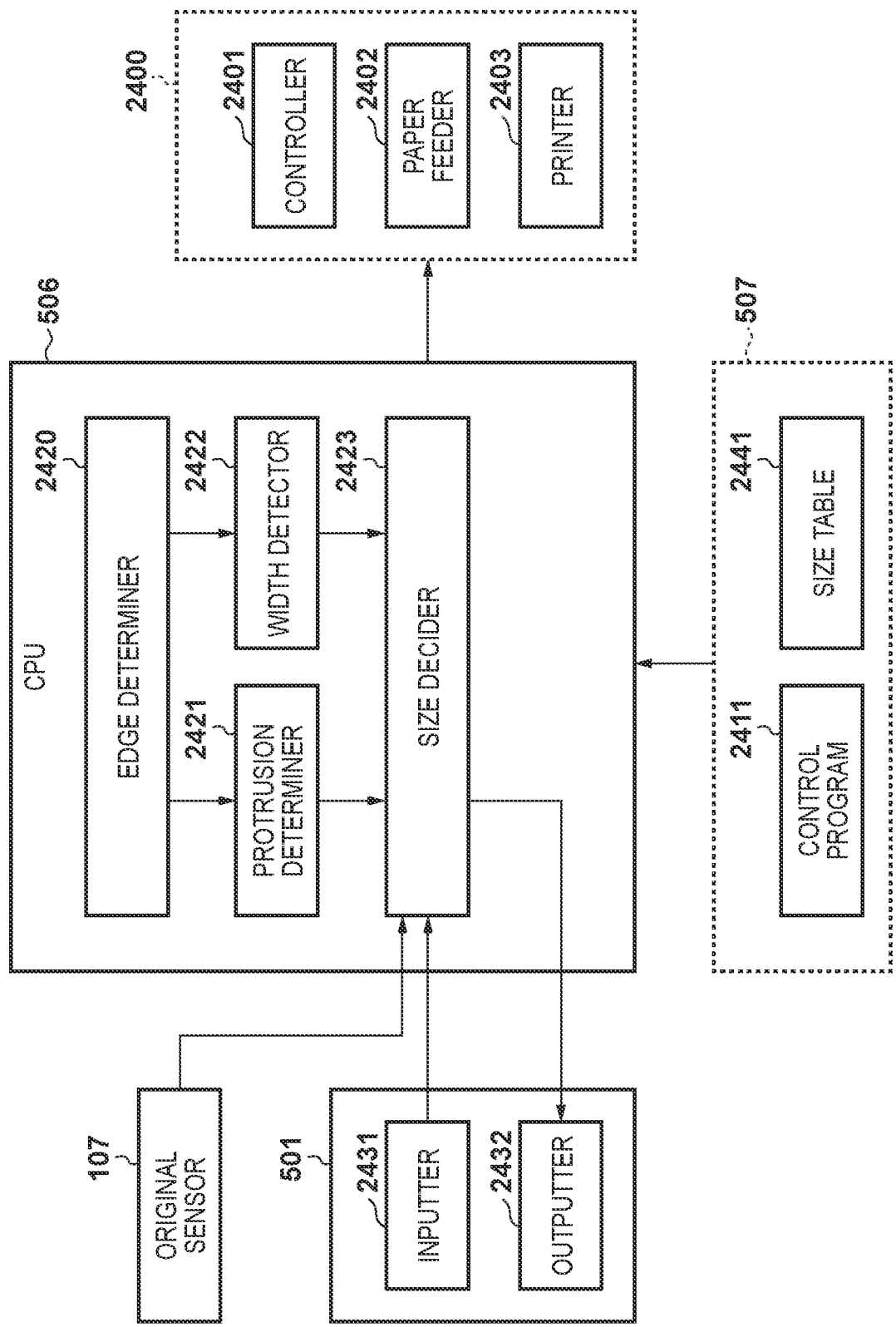
FIG. 24 is a view for describing functions of a CPU.

FIG. 24 is a view for describing functions realized by the CPU 506 executing a control program 2411. Note that some or all of these functions may be realized by a logic circuit such as an ASIC, an FPGA, or the like. ASIC is an abbreviation for application specific integrated circuit. FPGA is an abbreviation for field-programmable gate array.

In FIG. 24, the information indicating the original size is assumed to be used in an image forming apparatus 2400. Note that the original reading apparatus 1 may be a portion of the image forming apparatus 2400 which is a copying machine or a multifunction peripheral. A controller 2401 of the image forming apparatus 2400 instructs a paper feeder 2402 to feed a sheet in accordance with information indicating the original size outputted from the CPU 506. The paper feeder 2402 has a plurality of sheet cassettes, and each houses sheets of different sizes. The paper feeder 2402 feeds a sheet of a size designated by the controller 2401. A printer 2403 forms an image on a sheet fed from the paper feeder 2402. The controller 2401 controls the printer 2403 based on an image signal outputted from the image processing circuit 509, and causes an image corresponding to the original 101 to be formed on a sheet. Note that the printer 2403 is one example of an image forming unit that forms an image on a sheet based on an image signal generated by the original reading apparatus 1 reading the original 101.

The CPU 506 realizes various functions by executing the control program 2411 which is stored in the nonvolatile memory 507. A protrusion determiner 2421 is one example of a determiner that determines that the original 101 is not protruding from the readable range 113 if the reader 106 can read the mark. Also, the protrusion determiner 2421 is one example of a determiner that determines that the original 101 is protruding from the readable range 113 if the reader 106 cannot read the mark. In this way, the protrusion determiner 2421 determines protrusion of the original 101 based on whether or not the reader 106 can read the mark provided on the pressure plate 104. By this, it is possible to detect that the original 101 is protruding from the readable range 113.

An edge determiner 2420 is one example of a detector that detects an edge that is parallel to the sub scanning direction in the image obtained by the reader 106. The edge determiner 2420 recognizes the presence/absence of an edge or the position of an edge based on the edge count value outputted from the edge counting circuit 511. Also, the protrusion determiner 2421 may determine protrusion of the original in accordance with whether or not an edge corresponding to a mark is detected by the edge determiner 2420. As illustrated in FIG. 6, the edge detection circuit 510 is one example of a binarizer that binarizes the value of each pixel that configures an image. As illustrated in FIG. 7, the edge counting circuit 511 is one example of an adder that obtains a sum by adding values of each pixel binarized for each block, which is a group of a plurality of pixels that configure the readable range 113. As illustrated in FIG. 16, the edge determiner 2420 may detect an edge for each block in accordance with whether or not the sum (edge count value) is exceeding an edge threshold for detecting an edge.

The original sensor 107 is one example of a length detector (second obtainer) that is provided within the housing 100, and that detects a length of the original 101 in the sub scanning direction. The original sensor 107 may be called a size sensor. As described using FIG. 16, a width detector 2422 is one example of a width detector (first obtainer) that detects a width of the original 101 in the main scanning direction based on the position of an edge positioned outermost in the main scanning direction. As described using FIG. 17 and the like, the size decider 2423 is one example of a size decider that decides the size of the original 101 based on a detection result (sub scanning length) of the original sensor 107 and a detection result (main scanning length) of the width detector 2422. That is, the size decider 2423 works as a size determiner configured to determine a size of the sheet placed on the platen based on the information obtained by the first obtainer and the information obtained by the second obtainer. Note that the original size is a standard dimension (standard-size) that a standardization institution such as ISO, JIS, or ANSI defined. The size decider 2423 may decide the original size by referencing a size table 2441 as illustrated in FIG. 17 and FIG. 19. There are cases in which the protrusion determiner 2421 determines when the original 101 is protruding from the readable range 113. In such a case, the size decider 2423 may determine the width of the original 101 to be the width of an original of a maximum size that can be held in the readable range 113. In this way, the burden on the operator is reduced because the size of the original 101 is decided even if the original 101 is protruding from the readable range 113. Also, since the mark is provided within the readable range 113 and on the outside of the original of the maximum size and protrusion is determined based on the mark, there is meaning in deciding the original size to be the maximum size. This is because, in such a case, the operator often wishes to read the original on the original platen glass 102 as an original of the maximum size.

As described using FIG. 18, the size decider 2423 may determine the size of the original 101 to be indefinite when it is determined that the original 101 is protruding from the readable range 113. Also, an outputter 2432 of the console 501 may function as an outputter for outputting the size of the original that the size decider 2423 decides. The outputter 2432 is a display apparatus or the like. By this, the operator can recognize the size of the original that the original reading apparatus 1 decided. Also, the operator can understand that the original reading apparatus 1 could not decide the original size. An inputter 2431 of the console 501 is one example of an acceptor that accepts a designation of a width or an original size of the original 101. The inputter 2431 is a touch panel sensor, a numeric keypad, or the like. The size decider 2423 may decide the size of the original 101 based on a width of the original 101 accepted by the inputter 2431 when it is determined that the original 101 is protruding from the readable range 113. By this, the size of the original 101 is decided accurately. Note that the size decider 2423 may decide, as the size of the original 101, the original size accepted by the inputter 2431, when it is determined that the original 101 is protruding from the readable range 113. The CPU 506 is an example of a controller configured to control a display. The first information is displayed on the display by the controller in a case where the reader can read the mark. The second information is displayed on the display by the controller in a case where the reader cannot read the mark. The first information and the second information are different from each other. The first information may include information indicating that the reader can read the mark and/or the size of the original 101. The second information may include information indicating that the reader cannot read the mark and/or the size of the original 101.

As illustrated in FIG. 2 and the like, the positioning member 111 is one example of a first positioning member that is fixed to the housing 100 or the original platen glass 102, and that aligns the original 101 in a first direction of the original platen glass 102. A first direction is a sub scanning direction which is a direction in which an original is scanned. The positioning member 112 is one example of a second positioning member that is fixed to the housing 100 or the original platen glass 102, that is for aligning/positioning the original 101 placed on the platen by a user in a second direction orthogonal to the first direction, and that is shorter than the first position deciding member. The second direction may be a main scanning direction. The cover 103 is one example of a cover that comprises the pressure plate 104 on its bottom surface, that is fixed to the housing 100 via a hinge, and that opens/closes in relation to the original platen glass 102.

As FIG. 4 and the like illustrate, regarding the position of the mark in the pressing surface 119, when the longer side of an original of the maximum size is aligned in relation to the first position deciding member, at least a portion of the mark is at a position that is not hidden by the original when seen (as viewed) from the reader 106. An original of the maximum size is an original of the maximum size among a plurality of original sizes that are standardized and that can be fit entirely in the readable range 113, such as an original of the A3 size. Also, to reword, an original of the maximum size indicates the maximum of originals of standard sizes guaranteed to be readable by the original reading apparatus 1. When an original of the maximum size is aligned correctly in relation to the alignment origin 110 in the original platen glass 102 in this way, at least a portion of the mark is not hidden. Meanwhile, when an original that exceeds the maximum size, such as a map or a poster, is placed on the original platen glass 102, it is not possible for the reader 106 to read the mark because the mark is hidden. Using this relationship between the mark and the original size, the protrusion determiner 2421 detects protrusion of the original. Note that the position of the mark in the pressing surface 119 is a position at which at least a portion or the mark fits in the readable range 113 when the cover 103 is closed.

As FIG. 4 and the like illustrate, the distance from an edge of the positioning member 111 to the mark when the cover 103 is closed is longer than the length of the shorter side of the original of the maximum size and is shorter than the length of the shorter side of the readable range 113. Such a condition is one example of a condition that at least a portion of the mark is not hidden by an original of the maximum size which is correctly aligned.

As described using FIG. 3B, the mark may be the engraved marks 108 which are parallel to the sub scanning direction. The engraved marks 108 may be formed by digging a straight line groove or hole in relation to the pressing surface 119 of the pressure plate 104, or irradiating a laser beam. In other words, the engraved marks 108 have the advantage that they do not require a member other than the pressure plate 104.

As described using FIG. 20B, the mark may be the seal 2002 which has a side that is parallel to the sub scanning direction and is stuck to the pressing surface 2003. By employing the seal 2002, it becomes possible to employ a thin pressure plate 2001 as the thick the pressure plate 104, and manufacturing cost is reduced.

As illustrated in FIG. 22, the mark may be a line that is formed in parallel to the sub scanning direction by printing or painting. The printed lines 2202 and painted lines can reduce manufacturing costs compared to the seal 2002. Note that the color of the mark is different to the color of the pressing surface 2203. With the printed lines 2202 or painted lines, a step does not occur in relation to the pressing surface 2203. Accordingly, by changing the color of the mark and the color of the pressing surface 2203, it is possible to emphasize an edge of a boundary between the mark and the pressing surface 2203. The color of the mark may be gray, for example. The color of the mark may be black, but it is possible that a black mark will visible through a thin original. With a gray mark, the possibility that the mark will be seen through a thin original is reduced. Note that the length of the mark in the sub scanning direction may be sufficient if it is 3 mm or more. Note that the length of the mark depends on the read resolution of the reader 106 and the size of one pixel. If the read resolution is 600 dpi, it is possible to detect the mark accurately by employing a mark of a length of 3 mm or more. As with the engraved marks 108 and the printed lines 2202, the mark may be a plurality of marks provided at different positions in the sub scanning direction. As described above, there is a tolerance for the attachment position of the pressure plate 104. Accordingly, by providing a plurality of marks, it becomes possible to reduce the influence of the tolerance of the pressure plate 104.

As described using FIG. 12, in the sub scanning direction, the position at which mark detection is executed and the position at which an edge corresponding to a width of an original is extracted may differ. This may be necessary in a method for mark detection and original width detection from a position of an edge extracted from an image. In other words, by imposing such a condition, it becomes possible to execute mark detection and original width detection accurately.

As FIG. 2 and the like illustrate, the distance from the leading edge position P0 of the original 101 aligned in the sub scanning direction to the original sensor 107 is shorter than the longer side of an original of the maximum size that can fit into the readable range 113 and longer than the shorter side of an original of a size half the maximum size. For example, if the original sensor 107 can detect the original, it can be ascertained that the sub scanning length of the original is longer than the shorter side of A4. Also, if the original sensor 107 cannot detect the original, it can be ascertained that the sub scanning length of the original is less than the shorter side of A4. In other words, the size decider 2423 can distinguish an original of the A3 size placed horizontally and an original of the A4 size placed vertically, based on the result of the original sensor 107. Also, the distance from the leading edge position P0 of an original aligned in the sub scanning direction to the original sensor 107 is longer than the shorter side of an original of the A4 size and shorter than the longer side of an original of the B5 size. The size decider 2423 can distinguish an original of the B4 size and an original of the B5 size based on the result of the original sensor 107. Also, the size decider 2423 can distinguish an original of the A4R size and an original of the A5 size based on the result of the original sensor 107. Furthermore, the size decider 2423 can distinguish an original of the B5R size and an original of the B6 size based on the result of the original sensor 107. Also, the size decider 2423 can distinguish an original of the A5R size and an original of size smaller than A5R based on the result of the original sensor 107.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-068742, filed Mar. 30, 2017 which is hereby incorporated by reference herein in its entirety.

What is claimed is:

1. An image reading apparatus, comprising:
a reader including a platen having a transparency and on which a sheet is to be placed, a light source configured to emit light, and a reading element configured to read an image of the sheet placed on the platen by receiving the light emitted from the light source moving in a first direction and reflected on the sheet placed on the platen;
a pressure plate configured to open and close with respect to the reader and having a pressing surface configured to press the sheet placed on the platen towards the platen in a state where an angle of the pressure plate with respect to the reader is a closed angle corresponding to a state where the pressure plate is closed with respect to the reader;
a positioning member including a contact part contacted by one end in a second direction of the sheet placed on the platen, thereby a positioning of the sheet placed on the platen in the second direction is performed, the second direction being orthogonal to the first direction;
a mark provided in a region on the pressing surface, wherein a distance between the contact part of the positioning member and the mark in the second direction in a state where the angle of the pressure plate with respect to the reader is the closed angle is longer than a length of a sheet of a maximum size among standard sizes in a traverse direction perpendicular to a longitudinal direction of the sheet of the maximum size among the standard sizes and is shorter than a length of a readable region in the second direction, an area of the sheet of the maximum size among the standard sizes being smaller than an area of the readable region and the readable region being a region where the reading element is able to read an image;
a controller configured to determine a size of the sheet placed on the platen in the second direction based on a position of another end in the second direction of the sheet placed on the platen and aligned by the positioning member in a case where the reading element reads the mark in a state where the angle of the pressure plate with respect to the reader is the closed angle, the position of the another end in the second direction being determined based on a reading result of the reading element;
a notification unit configured to perform, in a case where the reading element does not read the mark in a state where the angle of the pressure plate with respect to the reader is the closed angle, notification prompting a user to input information for determining the size of the sheet placed on the platen in the second direction; and
an input unit configured to receive the information for determining the size of the sheet input by the user,
wherein the controller is configured to determine the size of the sheet placed on the platen in the second direction based on the information for determining the size of the sheet input by the user in a case where the reading element does not read the mark in a state where the angle of the pressure plate with respect to the reader is the closed angle.

2. The image reading apparatus according to claim 1, further comprising a sheet sensor disposed on the reader and configured to detect the sheet placed on the platen through the platen,
wherein the controller is configured to determine a size of the sheet placed on the platen in the first direction based on a detection result of the sheet sensor.

3. The image reading apparatus according to claim 2, further comprising a second positioning member including a contact part contacted by one end in the first direction of the sheet placed on the platen, thereby a positioning of the sheet placed on the platen in the first direction is performed,
wherein a distance, in the first direction, between the contact part of the second positioning member and a position at which the sheet sensor is disposed is shorter than a length of a sheet of the maximum size among the standard sizes in a longitudinal direction of the sheet of the maximum size and longer than a length of a sheet of a size smaller than the maximum size among the standard sizes in a traverse direction perpendicular to a longitudinal direction of the sheet of the size smaller than the maximum size.

4. The image reading apparatus according to claim 2, further comprising a second positioning member including a contact part contacted by one end in the first direction of the sheet placed on the platen, thereby a positioning of the sheet placed on the platen in the first direction is performed,
wherein a distance, in the first direction, between the contact part the second positioning member and a position at which the sheet sensor is disposed is longer than a length of a sheet of a A4 size in a traverse direction perpendicular to a longitudinal direction of the sheet of the A4 size and shorter than a length of a sheet of a B5 size in a longitudinal direction of the sheet of the B5 size.

5. The image reading apparatus according to claim 1, wherein the controller discriminates whether or not the reading element reads the mark based on both a first reading result of the reading element obtained by light emitted from the light source located at a first position in the first direction and a second reading result of the reading element obtained by light emitted from the light source located at a second position in the first direction, the first position is a position at which the mark is not provided in the first direction in a state where the angle of the pressure plate with respect to the reader corresponds to the closed position and the second position is a position at which the mark is provided in the first direction in a state where the angle of the pressure plate with respect to the reader corresponds to the closed position.

6. The image reading apparatus according to claim 5, wherein the controller discriminates whether or not the reading element reads the mark based on the first reading result and the second reading result obtained after obtaining the first reading result.

7. The image reading apparatus according to claim 6, wherein the first position is downstream of the second position in the first direction.

8. The image reading apparatus according to claim 1, wherein the reading result of the reading element includes a luminance value indicating a luminance of light received by the reading element, and
wherein the controller is configured to, based on the luminance value, detect another end in the second direction of the sheet placed on the platen and to discriminate whether or not the reading element reads the mark.

9. The image reading apparatus according to claim 1, wherein the reading element reads the image based on the size of the sheet in the second direction determined by the controller.

10. The image reading apparatus according to claim 1, wherein the notification unit is configured to notify the user of information indicating the size of the sheet in the second direction determined by the controller.

11. The image reading apparatus according to claim 1, wherein the mark is an engraved mark.

12. The image reading apparatus according to claim 1, wherein the mark is a seal attached to the pressing surface.

13. The image reading apparatus according to claim 1, wherein the mark is printing or painting on the pressing surface,
wherein a color of the mark is different from a color of the pressing surface.

14. The image reading apparatus according to claim 1, wherein a length of the mark in the first direction is 3 mm or more.

15. The image reading apparatus according to claim 1, wherein the mark includes a first line and a second line provided at different positions in the second direction, the first line being substantially parallel to the second line.

* * * * *